United States Patent
Yabe

(10) Patent No.: US 8,482,770 B2
(45) Date of Patent: Jul. 9, 2013

(54) DATA PROCESSING APPARATUS, DATA PROCESSING METHOD, AND STORAGE MEDIUM STORING COMPUTER PROGRAM THAT EXECUTES PROCESSING BASED ON A CONTROL REQUEST RECEIVED FROM AN EXTERNAL APPARATUS

(75) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 12/642,718

(22) Filed: Dec. 18, 2009

(65) Prior Publication Data

US 2010/0165392 A1    Jul. 1, 2010

(30) Foreign Application Priority Data

Dec. 26, 2008   (JP) .................................. 2008-335039

(51) Int. Cl.
*G06F 3/12* (2006.01)
(52) U.S. Cl.
USPC ....................................................... 358/1.15
(58) Field of Classification Search
None
See application file for complete search history.

(56) References Cited

U.S. PATENT DOCUMENTS

| 7,327,478 B2 | 2/2008 | Matsuda |
| 2002/0122203 A1* | 9/2002 | Matsuda ...................... 358/1.15 |
| 2006/0107212 A1* | 5/2006 | Lovat et al. ................... 715/700 |
| 2007/0297666 A1 | 12/2007 | Takeuchi |

FOREIGN PATENT DOCUMENTS

| JP | 2002-359718 A | 12/2002 |
| JP | 2007-076316 A | 3/2007 |
| JP | 2008-003834 A | 1/2008 |

* cited by examiner

*Primary Examiner* — Jeremiah Bryar
(74) *Attorney, Agent, or Firm* — Canon USA, Inc., IP Division

(57) ABSTRACT

A data processing apparatus that requests an external apparatus to execute apart of sequential processing, receives a control request from the external apparatus, and executes the sequential processing in response to the control request that reflects an execution result of the part of the sequential processing performed by the external apparatus, includes a generation unit configured to generate identification information that can be used to determine whether a processing execution request sent to the external apparatus is output via an operation unit of the data processing apparatus, a storage unit configured to store the identification information generated by the generation unit in a storage medium, a transmission unit configured to transmit the identification information generated by the generation unit to the external apparatus, a reception unit configured to receive the control request from the external apparatus.

13 Claims, 21 Drawing Sheets

FIG.9

| | Attribute | Datatype | |
|---|---|---|---|
| 901 | | | 902 |
| 903 | AuthSvcType | int | |
| 904 | AuthSerIP | varchar(256) | |
| 905 | SecurityToken | binary | |
| 906 | UserName | varchar(256) | |
| 907 | UserID | varchar(256) | |
| 908 | GroupName | varchar(256) | |
| 909 | GroupID | varchar(256) | |
| 910 | DomainName | varchar(256) | |
| 911 | Email | varchar(256) | |
| 912 | AccessRight | binary | |

EXAMPLE OF INFORMATION THAT IS UNIQUE TO IMAGE PROCESSING
APPARATUS TO BE USED WHEN IDENTIFICATION ID IS ISSUED

HOST NAME (IP ADDRESS) OF IMAGE PROCESSING APPARATUS,
UI EXECUTION DATE/TIME, AND RANDOMLY GENERATED CHARACTER STRING

1402

EXAMPLE OF IDENTIFICATION ID

IDENTIFICATION ID = (255. 255. 255. 255, 2008/01/01, AsdFGhJKL)

EXAMPLE OF INFORMATION THAT IS UNIQUE TO IMAGE PROCESSING APPARATUS TO BE USED WHEN IDENTIFICATION ID IS ISSUED

TYPE OF WEB SERVICE TO BE EXECUTED, HOST NAME (IP ADDRESS) OF IMAGE PROCESSING APPARATUS, UI EXECUTION DATE/TIME, AND RANDOMLY GENERATED CHARACTER STRING

2002

EXAMPLE OF IDENTIFICATION ID

IDENTIFICATION ID = (SCAN, 255. 255. 255. 255, 2008/01/01, AsdFGhJKL)

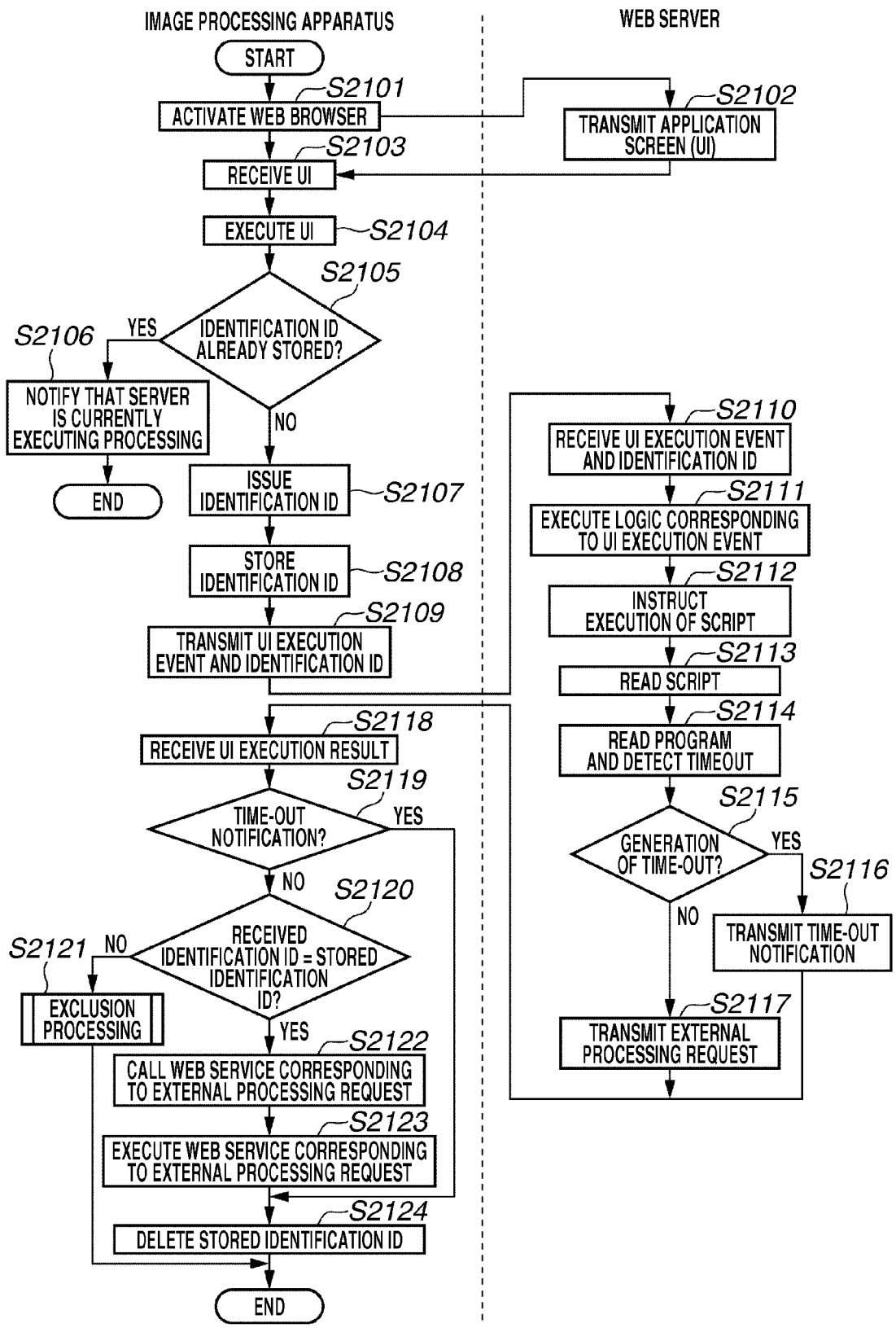

DATA PROCESSING APPARATUS, DATA PROCESSING METHOD, AND STORAGE MEDIUM STORING COMPUTER PROGRAM THAT EXECUTES PROCESSING BASED ON A CONTROL REQUEST RECEIVED FROM AN EXTERNAL APPARATUS

BACKGROUND OF THE INVENTION

1. Field of the Invention

The present invention relates to a data processing apparatus, a data processing method, and a computer program. The present invention is, for example, applicable to a system that executes processing based on a control request received from an external apparatus.

2. Description of the Related Art

A multiplex-type image processing apparatus, which is generally represented by a digital multifunction peripheral, is capable of performing various functions (e.g., printer, copy, facsimile, and scanner functions). The multiplex-type image processing apparatus includes a display unit, a print unit, and an imaging unit, which are disposed in an apparatus body, and also includes three types of application software programs corresponding to the printer, copy, and facsimile functions. The multiplex-type image processing apparatus enables users to select a desired operational mode so that the image processing apparatus can function as a printer, a copying machine, a facsimile machine, or a scanner.

The image processing apparatus may further include a web server function in addition to the above-described fundamental functions provided with the image processing apparatus. The web server function realizes a remote user interface that can provide a user interface of the image processing apparatus to a remote web browser. The image processing apparatus may further include a web browser as a web client function in addition to the above-described fundamental functions provided with the image processing apparatus. The web browser can be used to acquire (download) various contents from a remote web server and utilize the acquired (downloaded) contents for the functions of the image processing apparatus.

There is a conventional method for performing a display using a web browser of the image processing apparatus while installing user interfaces and logics for image processing apparatus applications on a web server. If an operation is input via the web browser of the image processing apparatus, a processing request is externally output to the image processing apparatus, as a remote request (e.g., a web service) via the web server.

According to the above-described method, as discussed in Japanese Patent Application Laid-Open No. 2008-003834, identification information (e.g., a host name) for identifying the web server is transmitted and received between the image processing apparatus and the web server to determine whether the processing request received from the web server is valid. If it is determined that the received processing request is valid, the image processing apparatus executes processing according to the request.

Further, as discussed in Japanese Patent Application Laid-Open No. 2002-359718, if one of an external processing request and an internal processing request is currently executed in the apparatus, it is useful to control the other processing request so as to prevent operations of the apparatus from conflicting with each other.

SUMMARY OF THE INVENTION

According to an aspect of the present invention, a data processing apparatus that requests an external apparatus to execute a part of sequential processing, receives a control request from the external apparatus, and executes the sequential processing in response to the control request that reflects an execution result of the part of the sequential processing performed by the external apparatus, includes a generation unit configured to generate identification information that can be used to determine whether a processing execution request sent to the external apparatus is output via an operation unit of the data processing apparatus, a storage unit configured to store the identification information generated by the generation unit in a storage medium, a transmission unit configured to transmit the identification information generated by the generation unit to the external apparatus, a reception unit configured to receive the control request from the external apparatus, a determination unit configured to determine whether the identification information stored on the storage unit coincides with identification information added to the control request received by the reception unit, and an execution unit configured to execute processing to be performed based on the control request if the determination unit determines that the identification information stored on the storage unit coincides with the identification information added to the control request received by the reception unit, wherein the execution unit is configured to execute the processing to be performed based on the control request after completing execution of processing to be performed based on the identification information stored on the storage unit, if the determination unit determines that the identification information stored on the storage unit does not coincide with the identification information added to the control request received by the reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 schematically illustrates an example of a data structure for an authentication context according to the first exemplary embodiment of the present invention.

FIG. 14 illustrates an example of identification ID according to the first exemplary embodiment of the present invention.

FIG. 20 illustrates an example of identification ID according to the third exemplary embodiment of the present invention.

FIG. 21 is a flowchart illustrating an example of processing to be performed by the image processing system according to a fourth exemplary embodiment of the present invention.

DESCRIPTION OF THE EMBODIMENTS

Figure 1:
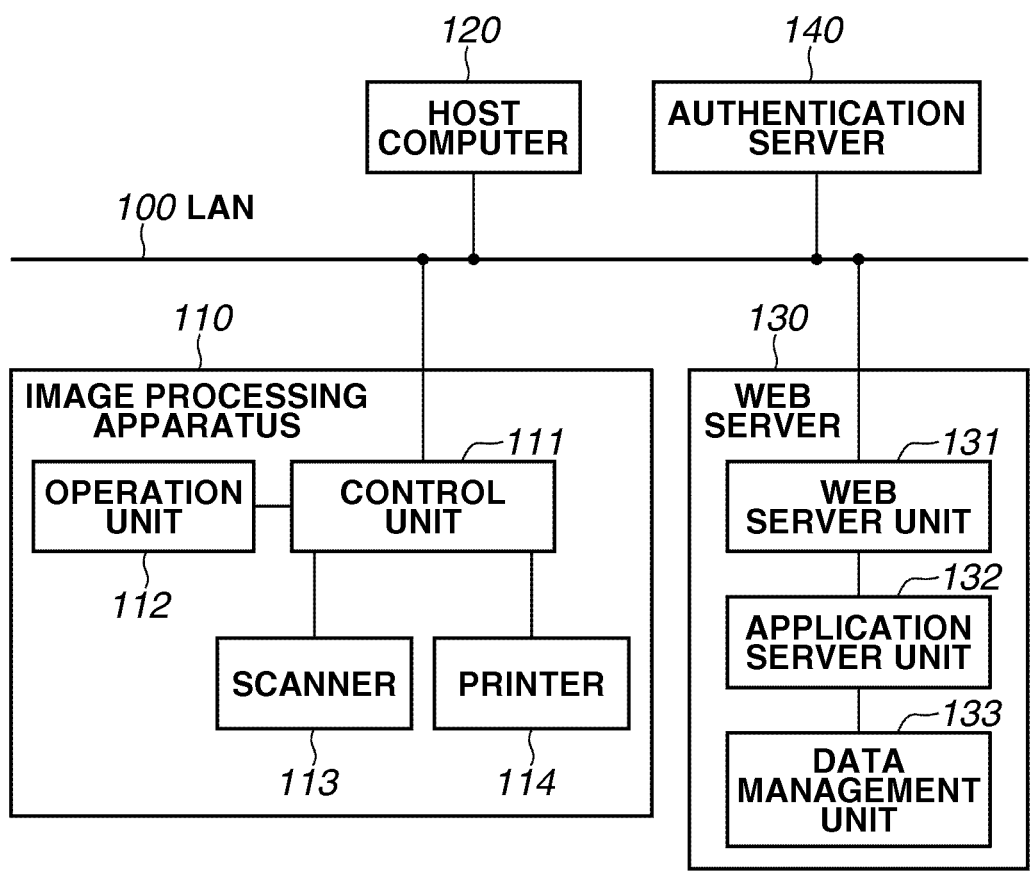
FIG. 1 is a block diagram illustrating an example of an overall configuration of an image processing system that includes an image processing apparatus according to a first exemplary embodiment of the present invention.

Various exemplary embodiments, features, and aspects of the invention will be described in detail below with reference to the drawings. It is noted that throughout the specification, the same reference numerals and letters refer to similar items in the following figures, and thus once an item is described in one figure, it may not be discussed for following figures.

FIG. 1 is a block diagram illustrating an example of an overall configuration of an image processing system that includes an image processing apparatus.

In FIG. 1, a local area network (LAN) 100 is connected to a wide area network (WAN) or the Internet. A host computer 120 is connected to the LAN 100. The host computer 120 includes a web browser and can receive various services, via a HyperText Transfer Protocol (HTTP) connection, from an image processing apparatus 110 and a server 130. The host computer 120 is, for example, a personal computer (PC) or a personal digital assistant (PDA), or a portable phone.

The web server 130 includes a software process group that can realize a web application server. The web server 130 includes, as software modules, a web server unit 131, an application server unit 132, and a data management unit 133.

The web server unit 131 can transmit an HTML or similar contents in response to an HTTP request (i.e., a request according to the HTTP protocol) from a client. The application server unit 132 can perform predetermined processing according to each HTTP protocol request and perform a dynamically changing HTTP response (i.e., a response according to the HTTP protocol).

More specifically, the application server unit 132 includes a Common Gateway Interface (CGI) program and Servlet. The data management unit 133 can store script data called from the application server unit 132 and data received by the web server 130. In general, the data management unit 133 has a function of permanently storing various data.

An authentication server 140 can perform user authentication and user information management. The authentication server 140 performs the user authentication referring to a credential transmitted from the image processing apparatus 110 or the web server 130. If the user authentication is successfully completed, the authentication server 140 returns a security token (hereinafter, referred to as "ST"). In the context of the present specification, the "credential" indicates credential information (e.g., user name, domain name, or password) that can be used for the user authentication. The "ST" is a mark indicating completion of authentication to be returned if it is determined that the credential is valid and the user authentication is successfully completed.

In a case where user authentication of two or more devices is performed by the authentication server 140, these devices can use the issued ST to identify each other and are not required to perform the credential-based user authentication again. The authentication server 140 can perform integral user authentication among devices connected to the LAN 100 and can correctly identify each user.

The image processing apparatus 110 is a digital multifunction peripheral (MFP) that can perform input/output and transmission/reception of image data and can perform various image processing on the image data. The image processing apparatus 110 includes a scanner 113 that can function as an image input device, a printer 114 that can function as an image output device, a control unit 111, and an operation unit 112 that can function as a user interface.

The scanner 113, the printer 114, and the operation unit 112 are respectively connected to the control unit 111 and controlled by the control unit 111. The control unit 111 is connected to the LAN 100.

Figure 2:
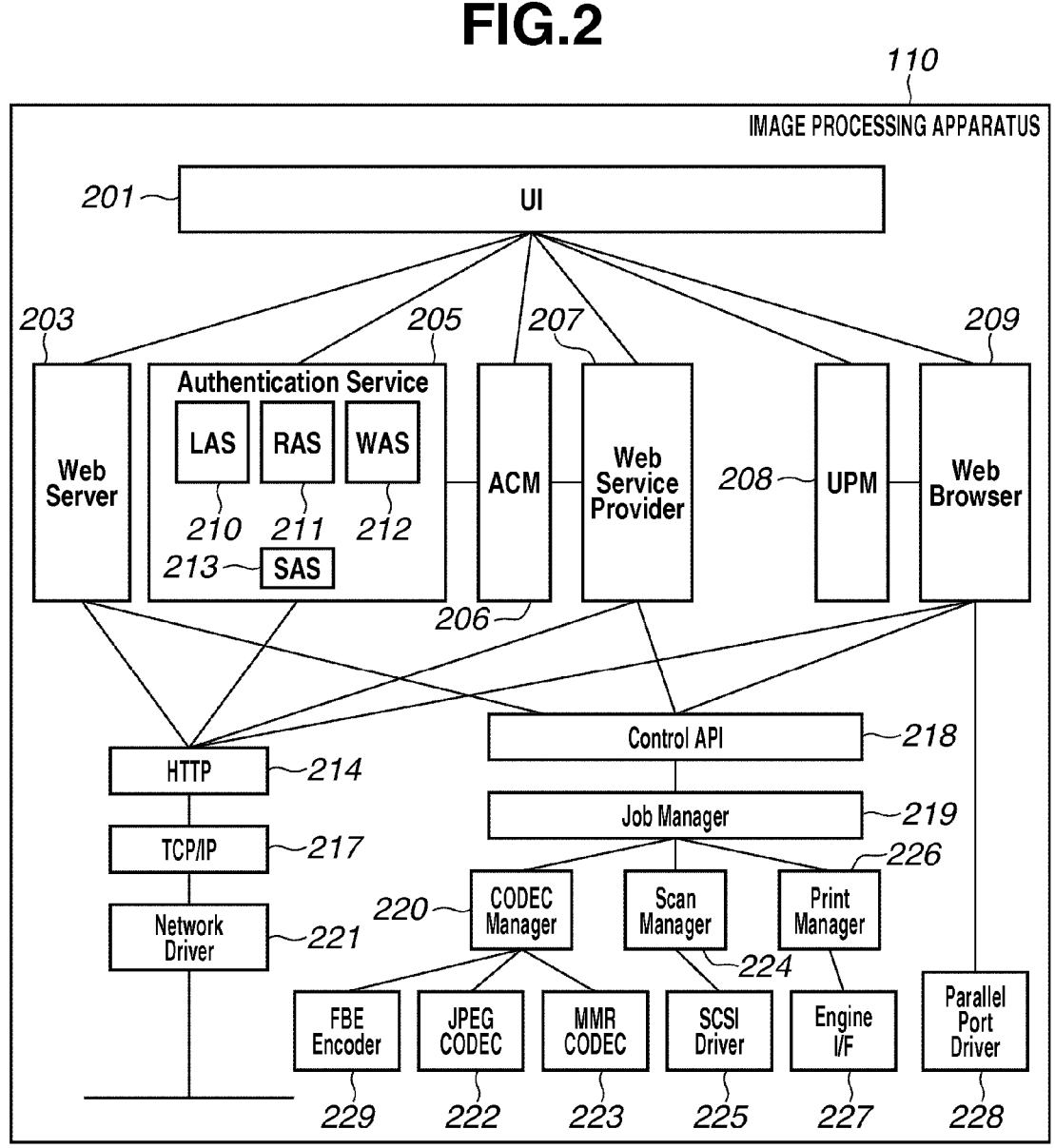
FIG. 2 is a block diagram illustrating an example of a software configuration of the image processing apparatus according to the first exemplary embodiment of the present invention.

Next, a software configuration of the image processing apparatus 110 is described below with reference to FIG. 2. FIG. 2 is a block diagram illustrating an example of the software configuration of the image processing apparatus 110.

In the image processing apparatus 110, a user interface (UI) module 201 is a module capable of performing intermediacy between user's operations and the image processing apparatus 110 when the operator performs various operations and settings for the image processing apparatus 110. The UI module 201 can transfer input information to various modules 203 and 205 to 209 described below according to respective operator's operations to request these modules to perform predetermined processing and/or data settings.

The web server module 203 can perform an HTTP response in response to an HTTP request received from a web client (e.g., the host computer 120). The HTTP response includes transmitting management information relating to the image processing apparatus 110 to the web client. The web server module 203 performs the HTTP response via an HTTP module 214 described below, a TCP/IP communication module 217, and a network driver 221.

The web browser module 209 can read information from various web sites (i.e., home pages) accessible via the Internet or an intranet and can perform a display of the read information. A detailed configuration of the web browser module 209 is described below.

The HTTP module 214 can be used when the image processing apparatus 110 performs HTTP communications. The HTTP module 214 uses the TCP/IP communication module 217 to provide communication functions to the web server module 203, the web browser module 209, and the web service provider module 207.

Further, the HTTP module 214 can provide communication functions according to HTTP and various protocols (especially, a security-related protocol) that are usable on the web.

The TCP/IP communication module 217 uses the network driver 221 to provide network communication functions to the above-described various modules. The network driver 221 controls a portion physically connected to the network (e.g., the LAN 100).

The authentication service module 205 can manage and control user authentication processing for enabling users to use various functions of the image processing apparatus 110. A local authentication service (LAS) module 210 can perform management and control for the authentication processing in response to the user authentication performed by the UI module 201. The local authentication service module 210 receives a credential from the UI module 201 and performs authentication processing with respect to the authentication server 140.

The credential and a data communication protocol required for the user authentication are different depending on an authentication method of the authentication server 140. Therefore, the local authentication service module 210 is replaceable with another authentication service module. In a case where the authentication method of the authentication server 140 is changeable, it is useful to replace the local authentication service module 210 with a suitable type.

The authentication method is, for example, NTLM authentication or Kerberos authentication. Further, when the local authentication service module 210 is replaced, a below-described simple authentication service module 213 can be used to perform authentication by executing an "authentication function in the image processing apparatus 110" that does not require the authentication server 140.

Further, when the local authentication service module 210 is replaced, various inputs (e.g., input of authentication information via a touch panel or a soft keyboard or input of the credential via a USB keyboard or a USB card reader) can be accepted.

A remote authentication service (RAS) module 211 can manage and control authentication processing for the user authentication to be performed by the web client via the web server module 203. The remote authentication service module 211 performs authentication processing with the authentication server 140 in response to a credential received from the web server module 203.

Similar to the local authentication service module 210, the remote authentication service module 211 is a replaceable module. In a case where the authentication method of the authentication server 140 is changed, it is useful to replace the remote authentication service module 211 with a suitable type.

A web service authentication service (WAS) module 212 can perform management and control for authentication processing to use the functions of the image processing apparatus 110 via the web service provider module 207 described below. The web service authentication service module 212 provides, as a web service, an interface that is accessible via the network to perform authentication processing.

The authentication context management (ACM) module 206 can manage the ST, which is returned from the authentication server 140 if the user authentication is successful, and user information that can be acquired from the authentication server 140. The authentication context management (ACM) module 206 is described below in detail. The web service provider module 207 can provide, as a web service, functions of the image processing apparatus 110 (device).

A user setting information management module (UPM) 208 can manage setting information and management information for each user. The ST is required to acquire the setting information of each user. Hence, the user setting information management module 208 uses the ST as an access key to acquire the setting information of each user.

The simple authentication service (SAS) module 213 is a module capable of performing user authentication and user information management in the image processing apparatus 110. The authentication can be selectively performed by the authentication server 140 or the simple authentication service module 213 by replacing the authentication services (i.e., the modules 210 to 212).

A control API 218 can provide, to an upstream module, an interface applicable to a downstream module. In the present exemplary embodiment, the upstream module is, for example, the web server module 203, the web browser module 209, or the web service provider module 207. On the other hand, the downstream module is, for example, a job manager module 219 described below. The control API 218 can reduce a mutual dependency between the upstream and downstream modules and can enhance their diversification.

The job manager module 219 can interpret various processing if it is instructed via the control API 218 from the above-described various modules 201, 203, and 205 to 209, and can output instructions to modules 220, 224, and 226 described below. Further, the job manager module 219 can integrally manage hardware processing to be executed in the image processing apparatus 110.

The CODEC manager module 220 can manage and control various compression and decompression of data, which is a part of the processing instructed by the job manager module 219. An FBE encoder module 229 can compress data if it is read through scan processing executed by the job manager module 219 or the a scan manager module 224 described below. For example, the FBE encoder module 229 can perform compression processing according to an FBE format.

A JPEG CODEC module 222 can perform JPEG compression processing on the data read through the scan processing executed by the job manager module 219 or the scan manager module 224. Further, the JPEG CODEC module 222 can perform JPEG compression and JPEG rasterization processing on print data obtained through print processing to be executed by the print manager module 226.

An MMR CODEC module 223 can perform MMR compression processing on the data read by the scan processing executed by the job manager module 219 or the scan manager module 224. Further, the MMR CODEC module 223 can perform MMR compression and MMR decompression processing on the print data obtained through the print processing to be executed by the print manager module 226.

The scan manager module 224 can manage and control the scan processing if it is instructed by the job manager module 219. The scan manager module 224 can communicate via the SCSI driver 225 with the scanner 113 that is internally connected to the image processing apparatus 110.

The print manager module 226 can manage and control print processing if it is instructed by the job manager module 219. An engine interface (I/F) module 227 provides an interface between the print manager module 226 and the printer 114.

Further, the image processing apparatus 110 includes a parallel port driver 228. The parallel port driver 228 provides an interface to be used when data is output to an output device (not illustrated).

Figure 3:
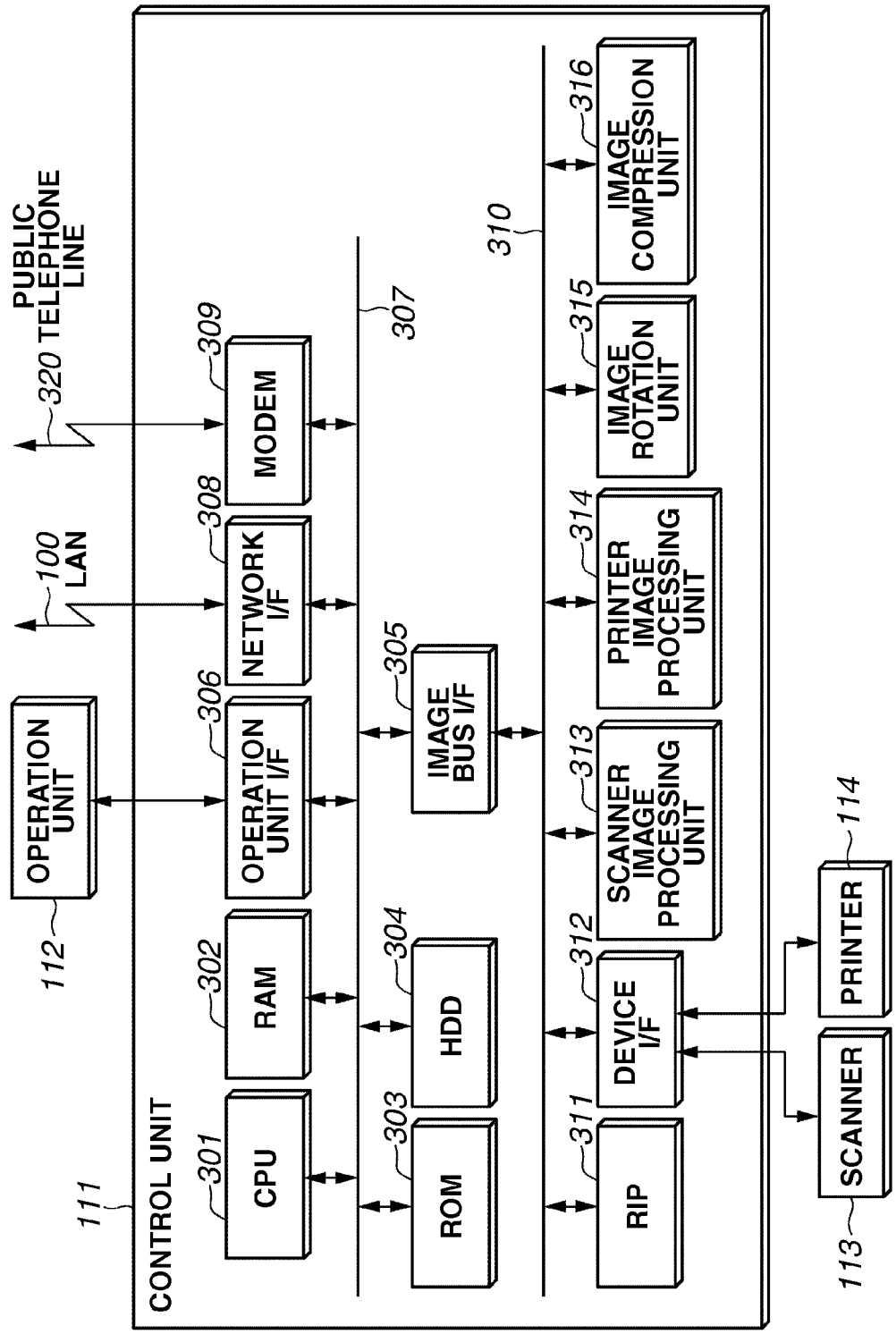
FIG. 3 is a block diagram illustrating an example of a hardware configuration of the image processing apparatus according to the first exemplary embodiment of the present invention.

Next, a hardware configuration of the image processing apparatus 110 is described below with reference to FIG. 3. FIG. 3 is a block diagram illustrating an example of the hardware configuration of the image processing apparatus 110.

In FIG. 3, the image processing apparatus 110 includes the control unit 111 that can control various operations to be performed by the image processing apparatus 110. The control unit 111 is connected to the scanner 113 that serves as the image input device and to the printer 114 that serves as the image output device. The control unit 111 can control the scanner 113 and the printer 114. The control unit 111 is further connected to the LAN 100 and a public telephone line 320. The control unit 111 can input and output image information and device information via the LAN 100 and the public telephone line 320.

The control unit 111 includes a central processing unit (CPU) 301. The CPU 301 is connected, via a system bus 307, to a random access memory (RAM) 302, a read only memory (ROM) 303, a hard disk drive (HDD) 304, an image bus interface (I/F) 305, an operation unit I/F 306, a network I/F 308, and a modem 309.

The RAM 302 is a memory that provides a work area for the CPU 301. Further, the RAM 302 can be used as an image memory that temporarily stores image data. The ROM 303 is a boot ROM, which stores a boot program for the system. The HDD 304 stores system software and image data.

The operation unit I/F 306 is an interface capable of performing data input/output processing with the operation unit 112. For example, the operation unit I/F 306 outputs image data to the operation unit 112 that displays the image data. Further, when a user operates the operation unit 112 to input information, the operation unit I/F 306 transmits the input information to the CPU 301.

The network I/F 308 is connected to the LAN 100 and can input and output information from and to an external apparatus via the LAN 100. The modem 309 is connected to the public telephone line 320 and can input and output information from and to an external apparatus via the public telephone line 320. The image bus I/F 305 can function as a bus bridge that is provided between the system bus 307 and an image bus 310 to perform data structural conversion for various data mutually transmitted between the system bus 307 and an image bus 310. The image bus 310 can be used to speedily transfer image data.

The image bus 310 is connected to a raster image processor (RIP) 311, a device I/F 312, a scanner image processing unit 313, a printer image processing unit 314, an image rotation unit 315, and an image compression unit 316.

The RIP 311 can rasterize a page description language (PDL) code received via the LAN 100 into a bitmap image. The device I/F 312 is an interface connecting the scanner 113 and the printer 114 to the control unit 111. The device I/F 312 can perform synchronous/asynchronous conversion processing on image data. The scanner image processing unit 313 can perform various (e.g., correction, modification, and editing) processing on input image data.

The printer image processing unit 314 can perform correction processing and resolution conversion processing on image data to be output from the printer 114. The image rotation unit 315 can perform processing for rotating image data. The image compression unit 316 can perform JPEG compression/decompression processing on input image data if the input image data is multi-valued image data and can perform Joint Bi-level Image Experts Group (JBIG), Modified Modified Read (MMR), and MH compression/decompression processing on input image data if the input image data is binary image data.

Figure 4:
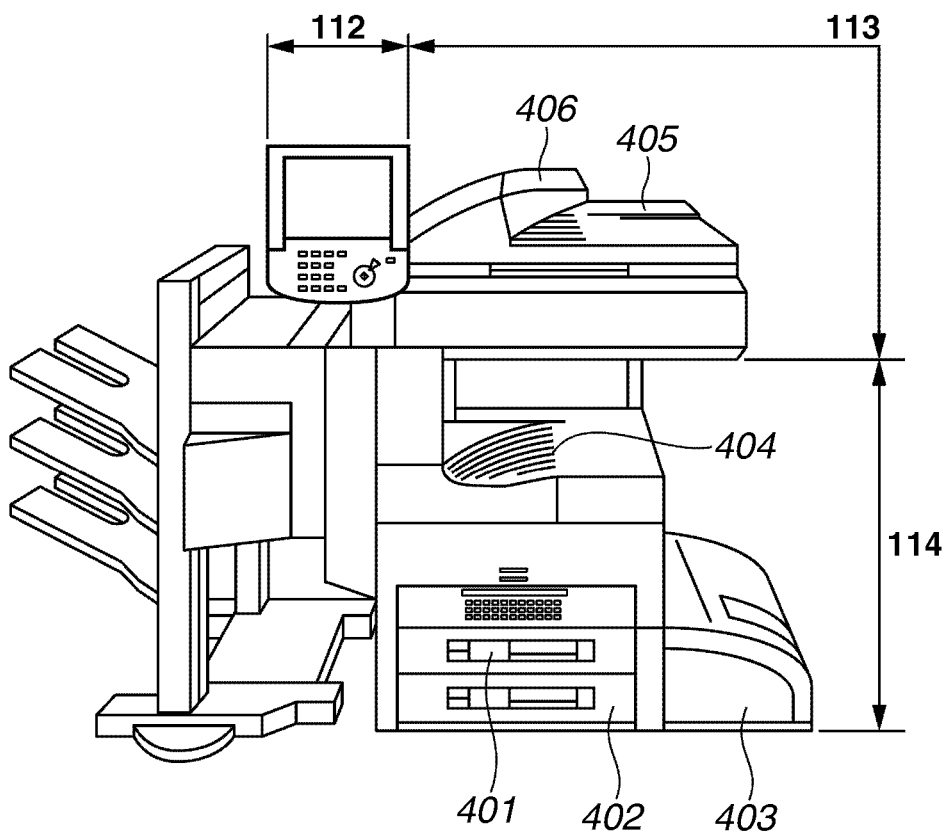
FIG. 4 illustrates an example of an external configuration of the image processing apparatus according to the first exemplary embodiment of the present invention.

Next, an external configuration of the image processing apparatus 110 is described below with reference to FIG. 4. FIG. 4 illustrates an example of the external configuration of the image processing apparatus 110.

The scanner 113 included in the image processing apparatus 110 can illuminate an image on a paper (i.e., an original) and performs scanning with a CCD line sensor (not illustrated) to generate raster image data. In general, a user sets original sheets on a tray 406 of a document feeder 405 and instructs reading processing via the operation unit 112.

Then, the CPU 301 of the control unit 111 sends an instruction signal to the scanner 113. Based on the instruction signal, the document feeder 405 feeds the original sheets one by one. The scanner 113 performs an operation for reading an image on each original sheet fed by the document feeder 405.

The printer 114 can print raster image data on a sheet according to a predetermined print method. The print method is, for example, an electrophotographic method using a photosensitive drum or a photosensitive belt. The print method is not limited to the electrophotographic technology. For example, the print method can be an inkjet method using a micro nozzle array that can discharge ink droplets to a sheet to directly print an image or can be another print method.

The printer 114 starts a print operation in response to an instruction signal supplied from the CPU 301. The printer 114 includes a plurality of paper feeding stages so that a sheet size and a sheet orientation can be selected among a plurality of types. To this end, the printer 114 includes a plurality type of sheet cassettes 401, 402, and 403. Further, the printer 114 includes a sheet discharge tray 404, onto which printed sheets are discharged.

Figure 5:
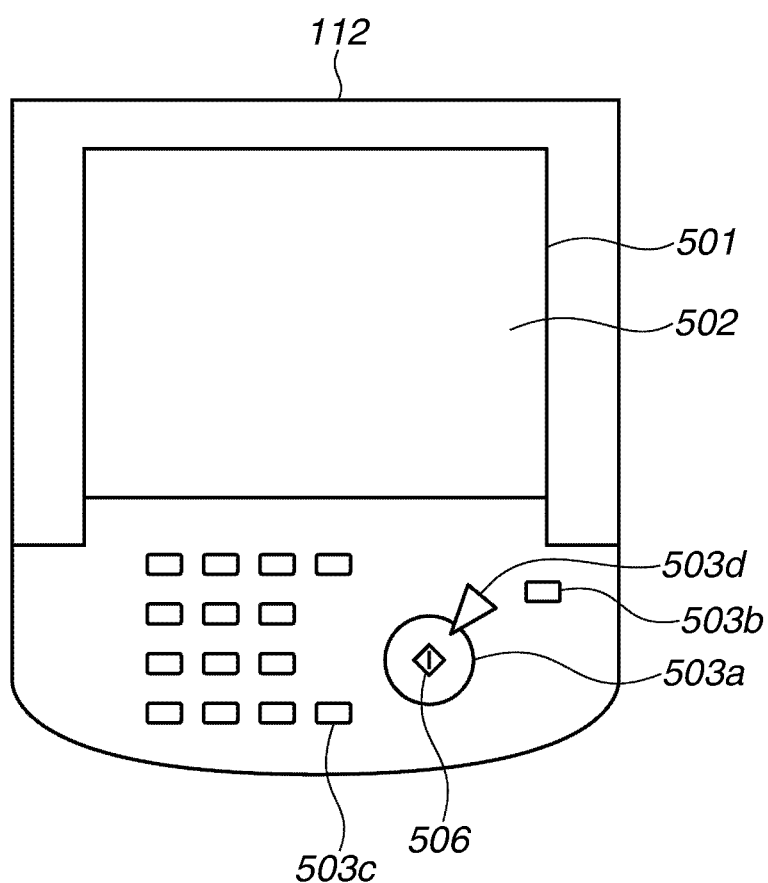
FIG. 5 illustrates an example of an external configuration of an operation unit included in the image processing apparatus according to the first exemplary embodiment of the present invention.

Next, a configuration of the operation unit 112 is described below with reference to FIG. 5. FIG. 5 illustrates an example of an external configuration of the operation unit 112 included in the image processing apparatus 110.

The operation unit 112, as illustrated in FIG. 5, includes an LCD display unit 501 that includes a liquid crystal display (LCD) covered with a touch panel sheet 502. The LCD display unit 501 can display a system operation screen and soft keys. When a user presses a soft key displayed on the LCD display unit 501, positional information indicating the pressed position is transmitted to the CPU 301.

Further, the operation unit 112 includes various hard keys, such as a start key 503*a*, a stop key 503*b*, an ID key 503*c*, and a reset key 503*d*. The start key 503*a* is a key that can be pressed to instruct starting an operation for reading an original image. A two-color LED display unit 506 is provided at the center of the start key 503a.

The two-color LED display unit 506 can switch its color (e.g., between green and red) to indicate an operable state of the start key 503a. The stop key 503b is a key that can be pressed to stop the operation being currently performed. The ID key 503c is a key that can be pressed when a user inputs a user ID. The reset key 503d is a key that can be pressed to initialize settings entered via the operation unit 112.

Figure 6:
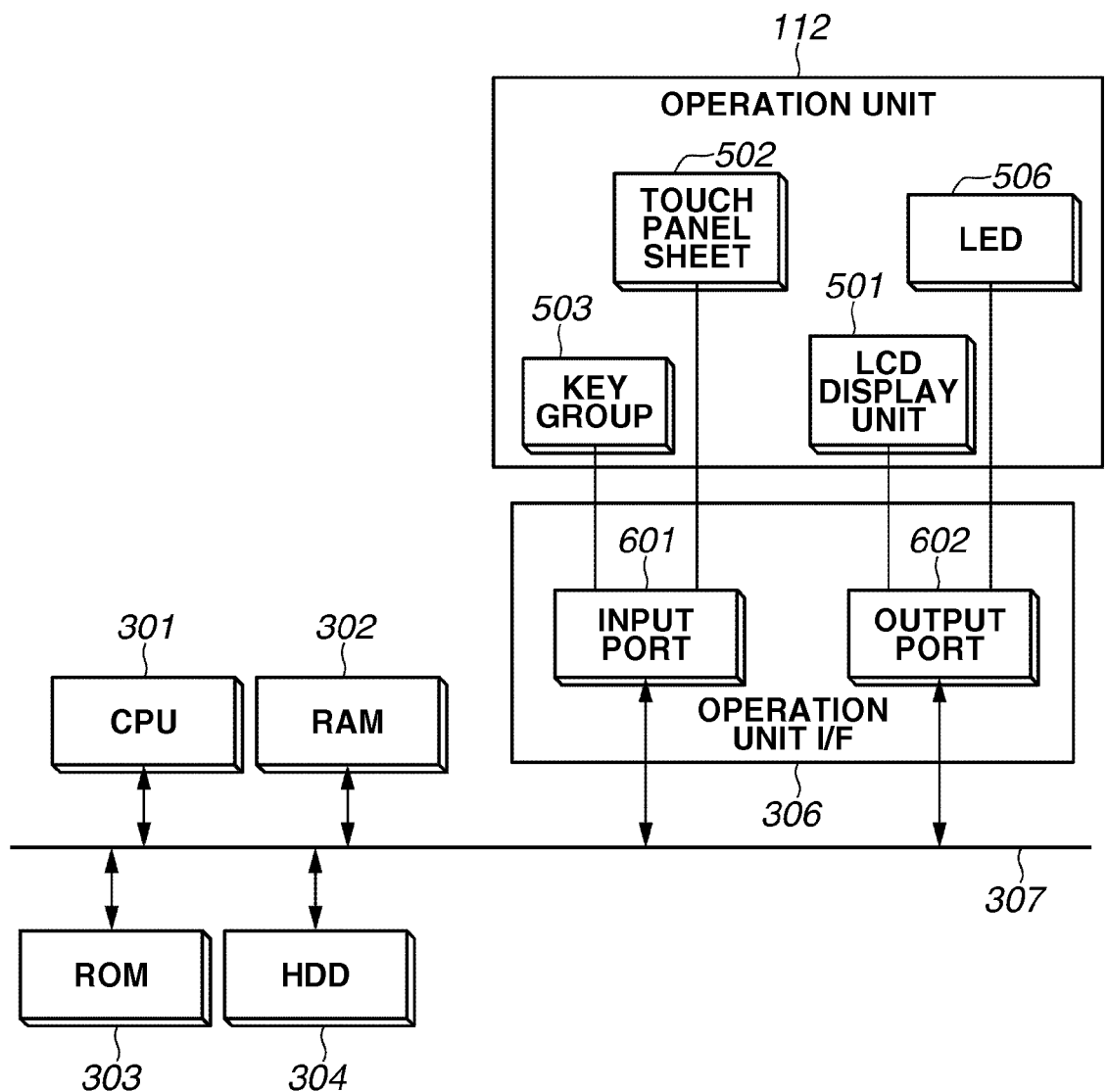
FIG. 6 is a block diagram illustrating an example of a detailed configuration of the operation unit according to the first exemplary embodiment of the present invention.

Next, a configuration of the operation unit 112 is described below with reference to FIG. 6. FIG. 6 is a block diagram illustrating an example of a detailed configuration of the operation unit 112.

The operation unit 112, as illustrated in FIG. 6, is connected to the system bus 307 via the operation unit I/F 306. As described above, the system bus 307 is connected to the CPU 301, the RAM 302, the ROM 303, and the HDD 304 (see FIG. 3).

The operation unit I/F 306 includes an input port 601 that can control an input entered by a user and an output port 602 that can control a screen output device. When a user inputs information by operating the touch panel sheet 502 and a key group 503 including various hard keys, the input port 601 sends the input information with reference to the CPU 301.

The CPU 301 generates display screen data based on user's input information and a control program, and outputs a display screen to the LCD display unit 501 via the output port 602. Further, the CPU 301 controls the two-color LED display unit 506, if necessary, via the output port 602.

The web browser module 209 can establish a connection to other network node, via the HTTP module 214, to perform communications. In this communication, an HTTP request is issued to a resource described using the URL and a response can be obtained. In this process, encoding and decoding of communication data can be performed according to various encoding methods.

An event processing unit (not illustrated) receives an operation event entered by a user who operates the touch panel sheet 502 or respective keys (i.e., the soft keys and the hard keys) provided on the operation unit 112. The event processing unit performs processing corresponding to each input event. Further, the event processing unit receives a state transition event relating to an operation or a job performed by the image processing apparatus 110 from the control API 218, and performs processing corresponding to each event.

A script interpreter (not illustrated) can interpret and execute various scripts, such as JavaScript® and ECMA Script. The script is, for example, embedded in a document or described in another file that is linked to the document. Each content provider can use a script for programming a dynamic behavior of a document to be provided.

Figure 7:
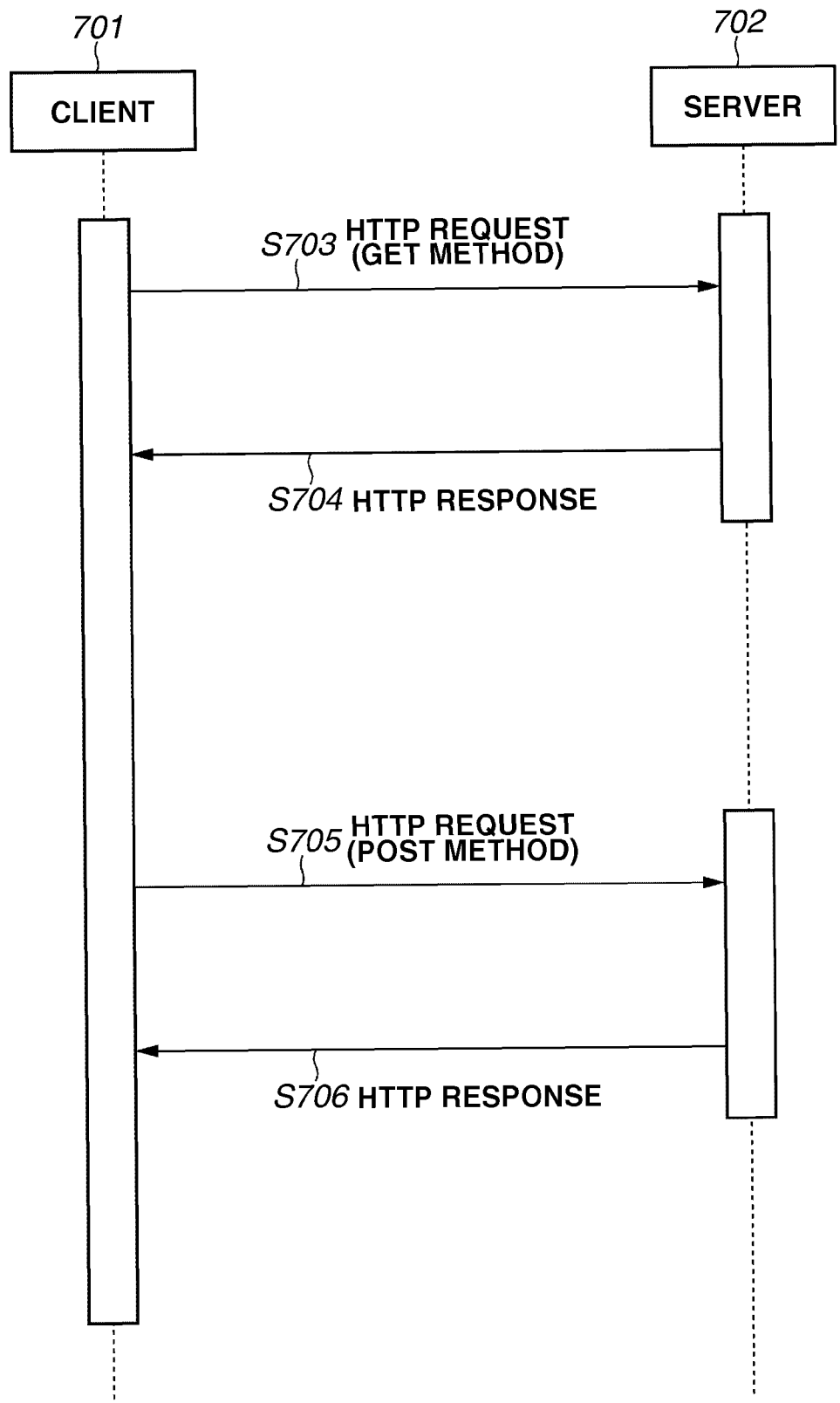
FIG. 7 illustrates an example flow of request and response processing based on HyperText Transfer Protocol (HTTP) protocols according to the first exemplary embodiment of the present invention.

FIG. 7 illustrates an example flow of request and response processing based on HTTP protocols. In FIG. 7, a client 701 is a software program capable of transmitting an HTTP request and receiving an HTTP response. The client 701 serves as a web browser installed on the image processing apparatus 110 and a general web browser that operates on the host computer 120. A server 702 is a software program capable of receiving the HTTP request from the client 701 and performing processing corresponding to the received HTTP request, and then returning the HTTP response to the client 701. The server 702 functions as the web server 130.

The client 701 can transmit the HTTP request according to a GET method or a POST method.

First, an example case where the client 701 transmits an HTTP request to the server 702 according to the GET method is described below. When the client 701 transmits an HTTP request 703 designating a desired resource to the server 702 according to the GET method, URI (especially, URL) can be used to designate the resource. The server 702 acquires or generates data corresponding to the resource designated by the HTTP request 703 and returns the acquired or generated data as an HTTP response 704.

Next, an example case where the client 701 transmits an HTTP request to the server 702 according to the POST method is described below. In a case where an HTML document includes a form that designates the POST method as its transmission method, the following processing is performed. More specifically, when a user inputs information in the form that can be displayed by a web browser of the client 701, the client 701 encodes the input information and attaches the encoded information (more specifically, the contents input in the form) to an HTTP request 705 that is transmitted to the server 702.

In the server 702, the designated resource processes the data received from the client 701 and generates an HTTP response 706 that is returned to the client 701.

Figure 8:
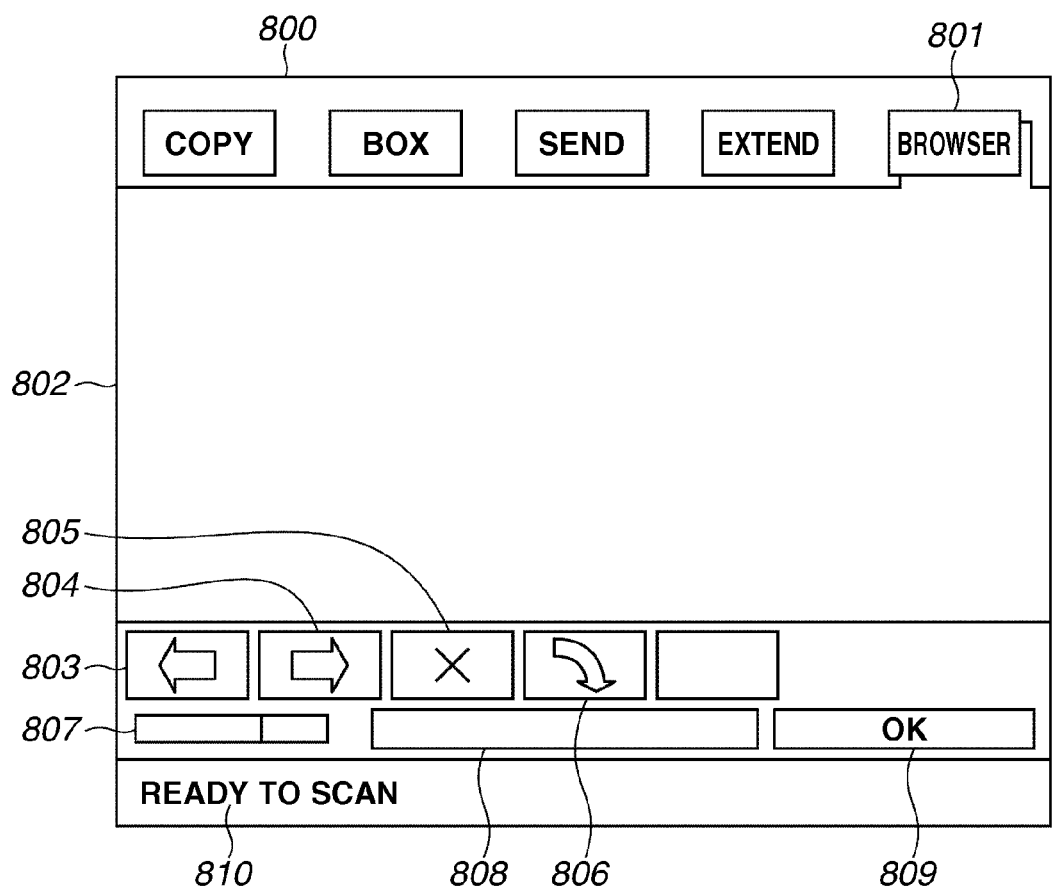
FIG. 8 illustrates an example of a web browser screen configuration to be displayed on the image processing apparatus according to the first exemplary embodiment of the present invention.

Next, a web browser screen configuration to be displayed on the LCD display unit 501 of the image processing apparatus 110 by the UI module 201 is described below with reference to FIG. 8. FIG. 8 illustrates an example of the web browser screen configuration to be displayed on the image processing apparatus.

A browser screen 800 illustrated in FIG. 8 includes a tab 801, an URL input field 808, an OK button 809, a progress bar 807, and a content display area 802, which are respectively displayed on the browser screen 800. The browser screen 800 further includes a back button 803, a forward button 804, a reload button 806, a stop button 805, and a status area 810, which are respectively displayed on the browser screen 800.

The tab 801 enables users to perform switching of functions between the screen dedicated to execution of a web browser function (the browser screen 800) and another screen dedicated to execution of the remaining (e.g., copy, box, send, or extend) function.

The URL input field 808 is a field that enables users to input URL information indicating a desired resource. When a user presses the URL input field 808, a virtual full keyboard (not illustrated) is displayed on the browser screen 800 to enable users to input characters. Users can input a desired character string by operating soft keys resembling keytops disposed on the virtual full keyboard.

The OK button 809 is a soft key that enables users to fix the input character string representing the URL information. When the OK button 809 is pressed to fix the URL information, the web browser module 209 issues, for example, an HTTP request to perform acquisition of the resource identified by the input URL information.

The progress bar 807 indicates a status of "contents acquisition processing" progressing according to an HTTP request or an HTTP response. The content display area 802 is an area where the acquired resource can be displayed. The back button 803 is a soft key that can be pressed by users to retroactively display a history of already displayed contents. Therefore, previously displayed contents can be displayed again by pressing the back button 803. The forward button 804 is a soft key that can be pressed by users, in a situation where the history of the previously displayed contents is currently displayed, to change the displayed contents in a time-sequential direction so as to approach the latest one.

The reload button 806 is a soft key that can be pressed by users to perform re-acquisition and re-display of the presently displayed contents. The stop button 805 is a soft key that can be pressed by users to stop contents acquisition processing that is currently executed. The status area 810 is an area where messages relating to various functions of the image processing apparatus 110 can be displayed.

For example, to give caution to users, any message relating to the scanner 113, the printer 114, or other function can be displayed in the status area 810 in a state where the browser screen 800 is displayed. Further, the web browser function can perform a message display in the status area 810. The web browser function can display a character string of an URL representing a link destination, a character string of a title of contents, and a message instructed by a script, in the status area 810.

The authentication context management module 206 illustrated in FIG. 2 can manage each authentication context. If the authentication is successfully completed, the authentication service modules 210, 211, and 212 send information required to generate an authentication context to the authentication context management module 206. The authentication context management module 206 generates an authentication context based on the information received from any one of the authentication service modules 210, 211, and 212. The authentication context management module 206 writes user information into the generated authentication context.

Once the user information has been written in the authentication context after the authentication successfully completed, any operation to be performed by the same user can be permitted based on user authority written in the authentication context. The authentication context management module 206 can further manage the life cycle of each authentication context. The life cycle of each authentication context indicates the duration of time between the timing when the authentication context is generated and the timing when a user performs log-out processing.

The log-out processing is triggered by user's activation of the log-out processing or when no operation is performed within a predetermined time-out duration being set beforehand is expired. Furthermore, the log-out processing can be triggered in response to any change in various device settings, or when the operational mode is changed to a low-power mode, or when the image processing apparatus 110 is reactivated.

A data structure of the authentication context is described below with reference to FIG. 9. FIG. 9 schematically illustrates an example of the data structure for the authentication context.

In FIG. 9, an attribute of each authentication context is described in the row of "Attribute" 901 and a data type of each attribute is described in the row of "Datatype" 902.

Information required to identify the authentication service module (210, 211, or 212) that has generated the authentication context is stored as an authentication service type attribute (AuthSvcType) 903. An IP address of the authentication server 140 is stored as an authentication server address attribute (AuthSerIP) 904.

An ST acquired from the authentication server 140 is stored as a ST attribute (SecurityToken) 905. A user name acquired from the authentication server 140 is stored as a user name attribute (UserName) 906. A user ID of the user, which is acquired from the authentication server 140, is stored as a user ID attribute (UserID) 907.

A group name of a group to which the user belongs, which is acquired from the authentication server 140, is stored as a group name attribute (GroupName) 908. A group ID of the group acquired from the authentication server 140 is stored in a group ID attribute (GroupID) 909. A domain name to which the user belongs, which is acquired from the authentication server 140, is stored as a domain name attribute (Domain-Name) 910. A mail address of the user, which is acquired from the authentication server 140, is stored as a mail address attribute (Email) 911.

Figure 10:
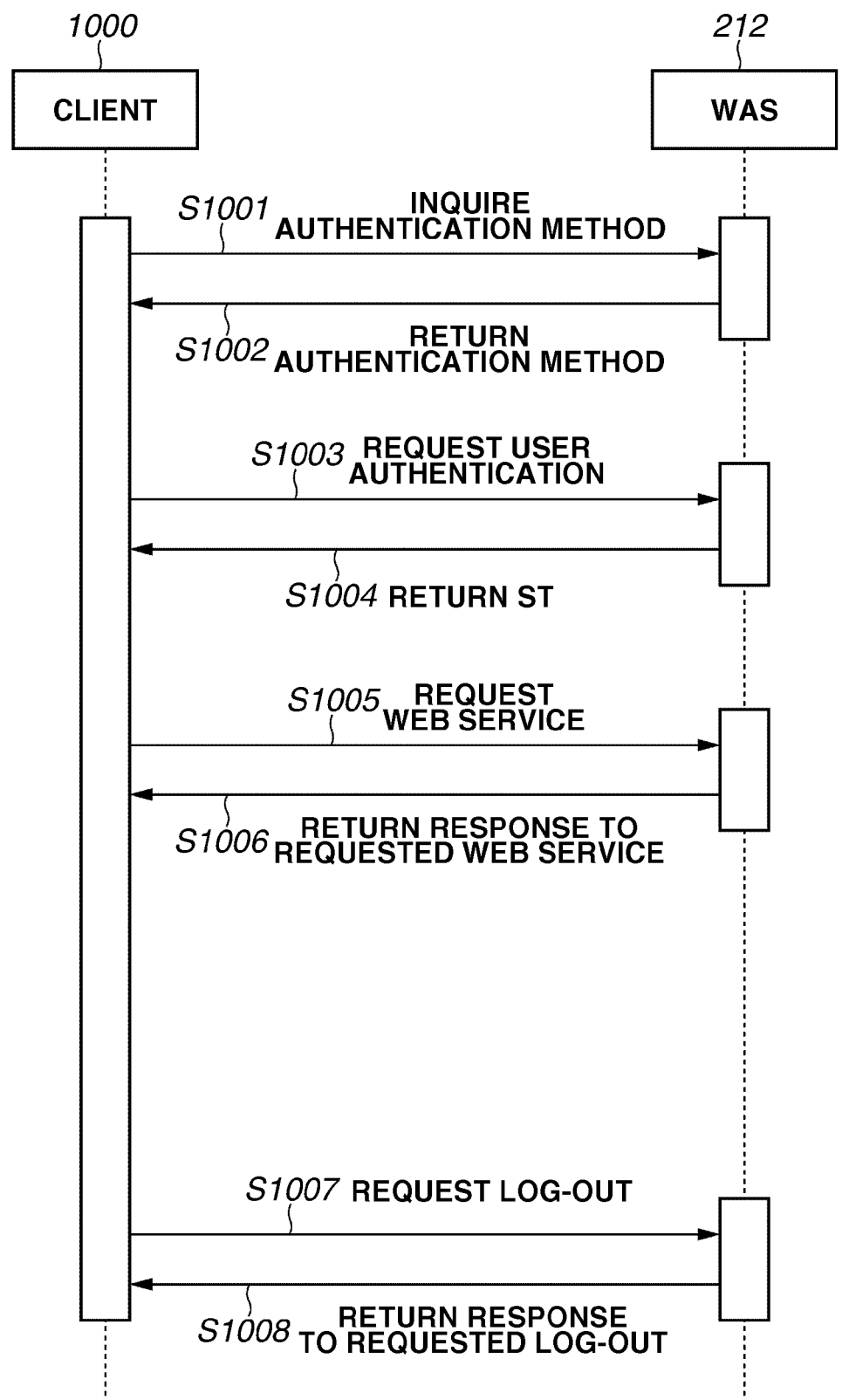
FIG. 10 illustrates an example flow of processing to be performed for a web service authentication service module according to the first exemplary embodiment of the present invention.

FIG. 10 illustrates an example flow of processing to be performed for the web service authentication service module 212.

A client 1000 is a software program capable of transmitting an HTTP request, as a web service, to the web service authentication service module 212 and receiving an HTTP response from the web service authentication service module 212. The client 1000 functions as the web server 130.

First, in step S1001, the client 1000 transmits an HTTP request inquiring an authentication method to the image processing apparatus 110 (i.e., the web service authentication service module 212).

Next, in step S1002, the web service authentication service module 212 returns the inquired authentication method to the client 1001.

Next, in step S1003, the client 1000 requests user authentication. If the client 1000 sends a credential to the web service authentication service module 212 to request the user authentication, the web service authentication service module 212 transmits the credential to the authentication server 140. The authentication server 140 performs user authentication based on the received credential. If the user authentication is successfully completed, the authentication server 140 returns an ST.

Further, in step S1003, the client 1001 sends an ST to the web service authentication service module 212. The web service authentication service module 212 requests the authentication server 140 to confirm whether the ST received from the client 1001 is valid. If it is determined that the ST sent from the client 1001 is valid, an "OK" response is returned from the authentication server 140.

If the user authentication is successfully completed, the web service authentication service module 212 requests the authentication context management module 206 to generate an authentication context. The authentication context management module 206 generates the requested authentication context based on the ST and user information and stores the generated authentication context. After the authentication context is generated, the user is allowed to use a service of the image processing apparatus 110 via a web service based on the user authority according to the generated authentication context.

Next, in step S1004, the web service authentication service module 212 returns the ST to the client 1001.

Next, in step S1005, the client 1001 inserts the ST into a header portion provided by the web service and sends an HTTP request relating to the web service to the image processing apparatus 110. The web service authentication service module 212 reads the ST described in the header portion of the HTTP request and determines whether the read ST is valid.

If it is determined that the ST is invalid, then in step S1006, the web service authentication service module 212 returns error information to the client 1001.

On the other hand, if it is determined that the ST is valid, the web service authentication service module 212 performs the following processing. More specifically, the web service authentication service module 212 confirms whether the authentication context generated via the local authentication service module 210 coincides with the authentication context generated via the web service authentication service module 212.

If it is determined that the above-described two authentication contexts coincide with each other, the web service authentication service module 212 calls a web service from the web service provider module 207. On the other hand, if it is determined that the compared authentication contexts do not coincide with each other, then in step S1006, the web service authentication service module 212 returns error information to the client 1001.

In step S1007, the client 1001 sends a log-out HTTP request to the image processing apparatus 110. When the web service authentication service module 212 receives the log-out request, the web service authentication service module 212 requests the authentication context management module 206 to discard an authentication context corresponding to the HTTP request. The authentication context management module 206 discards the corresponding authentication context.

In step S1008, the web service authentication service module 212 returns an "OK" response to the client 1001 if the authentication context is discarded in step S1007. On the other hand, if the authentication context is not discarded in step S1007, the web service authentication service module 212 returns an "NG" response to the client 1001.

Figure 11:
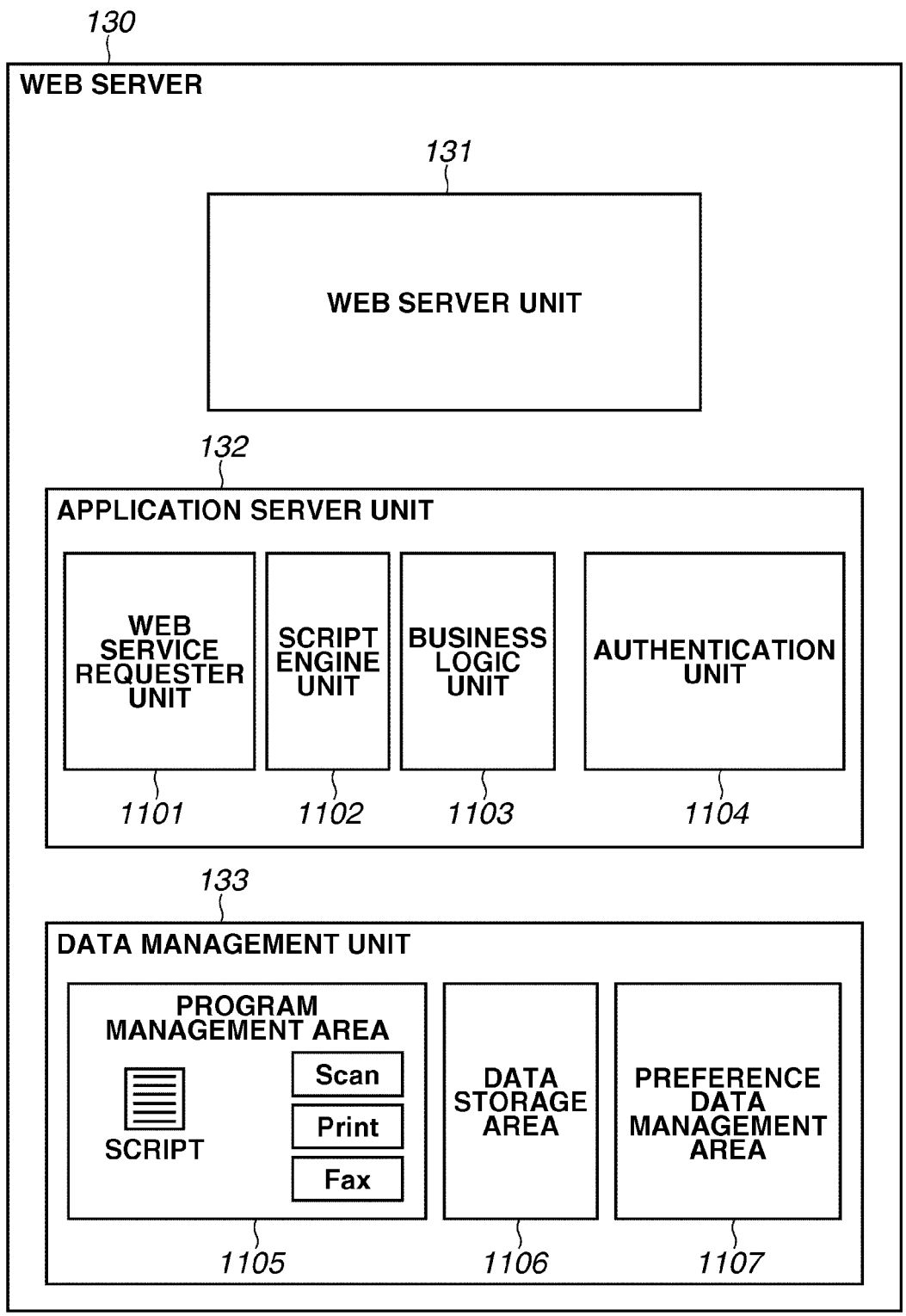
FIG. 11 is a block diagram illustrating an example of a functional configuration of a web server according to the first exemplary embodiment of the present invention.

Next, a detailed functional configuration of the web server 130 is described below with reference to FIG. 11. FIG. 11 is a block diagram illustrating an example of the functional configuration of the web server 130.

A business logic unit 1103 illustrated in FIG. 11 can be called from the web server unit 131 in response to an HTTP request. The business logic unit 1103 executes predetermined processing according to the HTTP request and returns a dynamically generated HTML, as a processing result, to the web server unit 131.

A script engine unit 1102, which is called from the business logic unit 1103, reads scripts (i.e., program execution descriptions) from a below-described program management area 1105. Then, the script engine unit 1102 returns the read scripts to the business logic unit 1103. The business logic unit 1103 successively executes the scripts read by the script engine unit 1102.

A web service requester unit 1101 can be called from the business logic unit 1103. The web service requester unit 1101 calls a web service from an external web service provider (e.g., the web service provider module 207).

An authentication unit 1104 is called from the business logic unit 1103. The authentication unit 1104 can perform management and control for the user authentication processing. The authentication unit 1104 can further manage the user information and user settings. The program management area 1105 can manage various scripts and programs, if these programs are called based on respective scripts. A plug-in mechanism (not illustrated) can add data into the program management area 1105 and can change the data stored in the program management area 1105. The plug-in mechanism can customize the functions of the web server 130.

A data storage area 1106 is an area capable of storing document data. A preference data management area 1107 is an area capable of storing setting information for each user. The business logic unit 1103 can acquire the setting information of each user from the preference data management area 1107, using the ST acquired by the authentication unit 1104 as an access key. The business logic unit 1103 can provide various screens and functions customized for each user based on the acquired setting information of each user.

Figure 12:
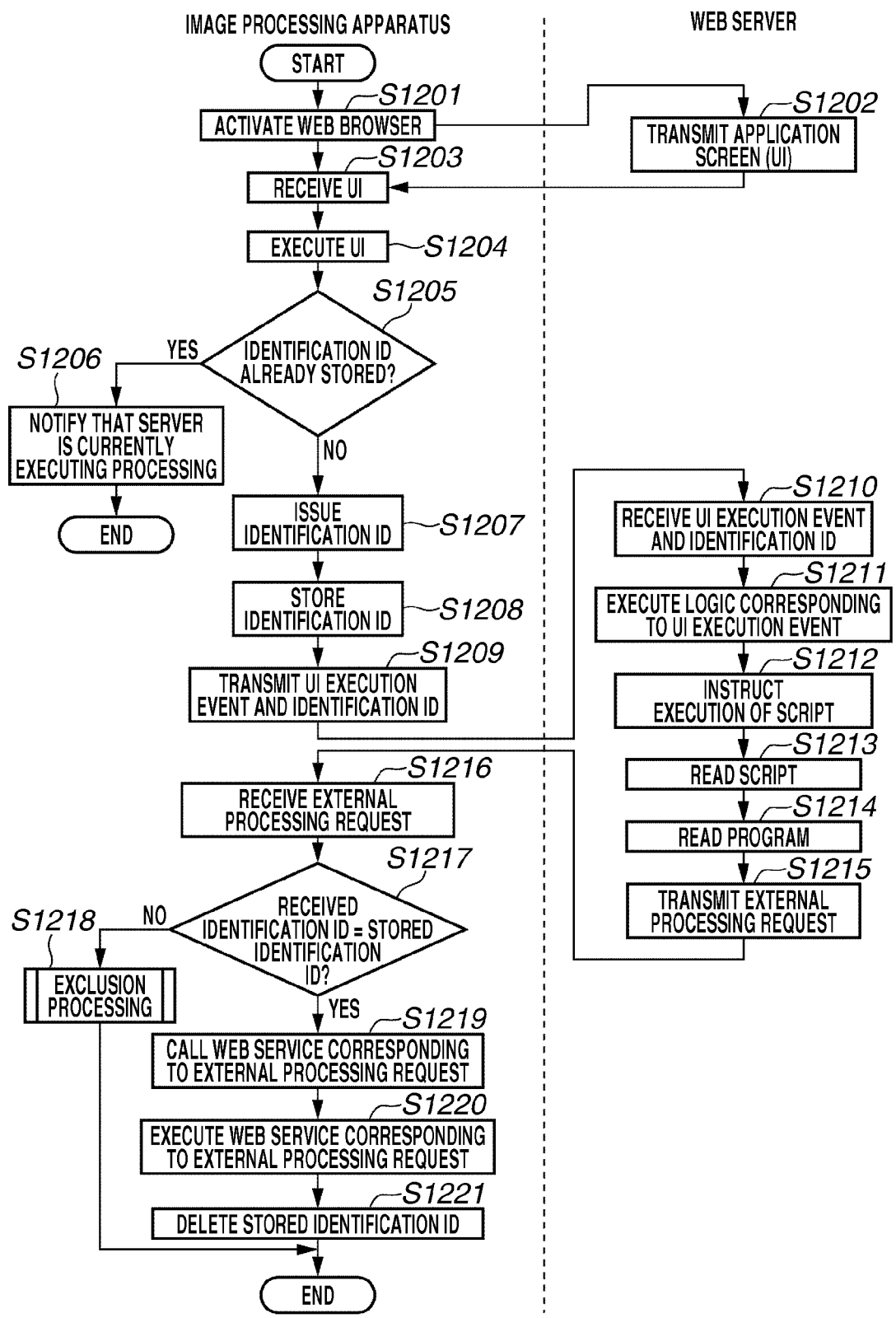
FIG. 12 is a flowchart illustrating an example of processing to be performed by the image processing system according to the first exemplary embodiment of the present invention.

Next, an example of processing to be performed by the image processing system is described below with reference to a flowchart illustrated in FIG. 12. The processing to be performed according to the flowchart illustrated in FIG. 12 is executable regardless of the presence of the authentication processing. Therefore, the description for the authentication-related processing illustrated in FIGS. 9 and 10 is not repeated again in the following description for the flowchart illustrated in FIG. 12.

First, in step S1201, the image processing apparatus 110 activates the browser screen 800 in response to an instruction entered by a user via the operation unit 112. When the browser screen 800 is activated, the web browser module 209 transmits an HTTP request according to the GET method to the URL of the web server 130, based on initial display URL information that is managed by the user setting information management module 208.

Next, in step S1202, the web server unit 131 of the web server 130 receives the HTTP request according to the GET method from the image processing apparatus 110. Then, the business logic unit 1103 constructs an application screen (UI) corresponding to the user and generates a screen UI.

The web server unit 131 transmits (returns), to the image processing apparatus 110, the application screen (UI) generated by the business logic unit 1103 as an HTTP response replying to the HTTP request transmitted in step S1201. The application screen (UI), for example, has an HTML format that can be interpreted and executed by the web browser module 209.

The business logic unit 1103 further generates two types of scripts in addition to the application screen (UI). The first script is a script for issuing an identification ID that can be used to determine whether a user who stands in front of the image processing apparatus 110 has input an instruction via the application screen (UI). In the following description, the first script can be referred to as an "identification ID issuance script" if necessary.

The second script is a script for storing an issued identification ID in the HDD 304 of the image processing apparatus 110. In the following description, the second script can be referred to as an "identification ID storage script" if necessary.

The web browser module 209 of the image processing apparatus 110 can execute the above-described first and second scripts. The web server unit 131 can transmit these scripts in association with the application screen (UI) to the image processing apparatus 110.

Next, in step S1203, the web browser module 209 of the image processing apparatus 110 receives the HTTP response, which contains the application screen (UI), the identification ID issuance script, and the identification ID storage script, from the web server 130. Then, the web browser module 209 displays the received application screen (UI) on the browser screen 800.

Figure 13:
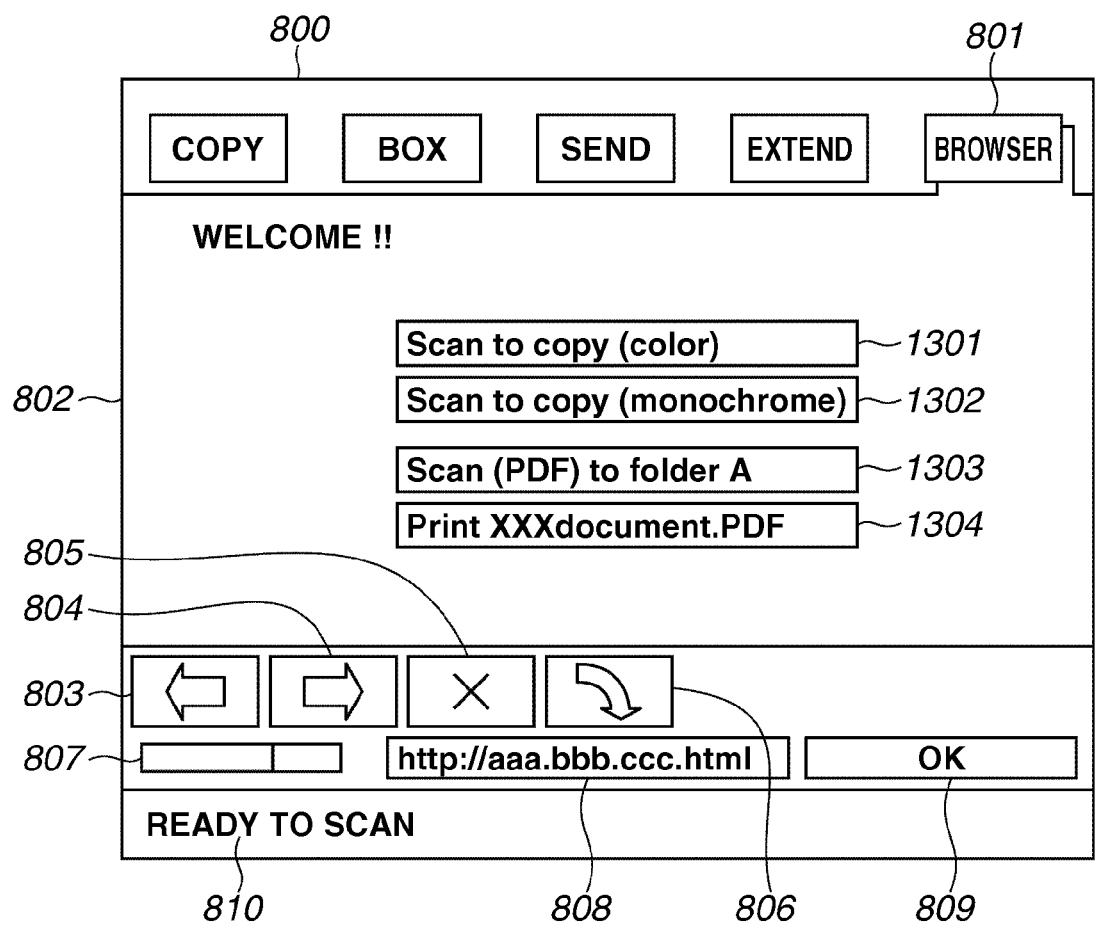
FIG. 13 illustrates an example of an application screen (UI) according to the first exemplary embodiment of the present invention.

FIG. 13 illustrates an example of the application screen (UI). The application screen (UI) illustrated in FIG. 13 includes a plurality of soft buttons 1301 to 1304 provided to detect instructions entered by a user via the operation unit 112 of the image processing apparatus 110. If any one of the soft buttons 1301 to 1304 is pressed by a user, a business logic corresponding to the pressed soft button starts its operation in the business logic unit 1103 of the web server 130.

After the operation of the activated business logic is completed, the web service requester unit 1101 calls a web service corresponding to each function via the web service provider module 207 of the image processing apparatus 110.

The soft button 1301 is a button that can be pressed by users to perform color printing after the image processing apparatus 110 accomplishes the scanning of the paper original. The soft button 1302 is a button that can be pressed by users to perform monochrome printing after the image processing apparatus 110 accomplishes the scanning of the paper original.

The soft button 1303 is a button that can be pressed by users, after the image processing apparatus 110 accomplishes the scanning of the paper original, to convert a scanned image data into PDF data and store the converted PDF data in a logic area (e.g., folder A) of the data storage area 1106 of the web server 130. The soft button 1304 is a button that can be pressed by users to cause the image processing apparatus 110 to print a PDF document (e.g., a document having a file name "XXXdocument.pdf") stored in the data storage area 1106 of the web server 130.

A business logic corresponding to each soft button can be defined by a script. Accordingly, in addition to the above-described soft buttons 1301 to 1304, any other soft buttons corresponding to various operation patterns can be provided if the script is differently defined.

As described above, an example of a second reception unit (i.e., a second acquisition step) according to the present exemplary embodiment can be realized, for example, by performing the processing of step S1203. Further, for example, information of the application screen (UI) can be regarded as information of the user interface. The identification ID issuance script can be regarded as information required to instruct execution of a generation unit. The identification ID storage script can be regarded as information required to instruct execution of a storage unit.

FIG. 14 illustrates an example of the identification ID. The identification ID illustrated in FIG. 14 can be issued in a below-described step S1207.

In FIG. 14, information 1401 is an example of information that constitutes the identification ID. According to the information 1401, at least one of the host names of the image processing apparatus 110 (IP address), application screen (UI) execution date and time, and randomly generated character string can be designated to issue the identification ID.

In FIG. 14, information 1402 illustrates an example of the identification ID. The identification ID issued in the below-described step S1207 is then stored in the HDD 304 of the image processing apparatus 110 in a below-described step S1208. If a user instructs to activate the application screen (UI) via the operation unit 112 of the image processing apparatus 110, the UI module 201 notifies the web browser module 209 of a button depression event.

In response to the button depression event, the web browser module 209 executes an identification ID issuance script that is related to the application screen (UI). In the present exemplary embodiment, the business logic unit 1103 of the web server 130 generates an identification ID issuance script according to the JavaScript format so as to correspond to the web browser module 209 of the image processing apparatus 110.

Referring back to FIG. 12, in step S1204, if an input of a screen UI execution instruction is detected, the UI module 201 of the image processing apparatus 110 notifies the web browser module 209 of a button depression event (i.e., an UI execution event). When the web browser module 209 receives the button depression event (i.e., the UI execution event), the web browser module 209 starts executing the identification ID issuance script that is related to the application screen (UI).

Next, in step S1205, the web browser module 209 determines whether there is any identification ID already stored in the HDD 304 of the image processing apparatus 110. If it is determined that there is an identification ID stored in the HDD 304 (YES in step S1205), the processing proceeds to step S1206. When the processing proceeds to step S1206, the web browser module 209 displays, on the browser screen 800, information indicating that the web server 130 is currently executing the processing (not illustrated) and interrupts the execution of the application screen (UI).

On the other hand, if it is determined that there is not any identification ID stored in the HDD 304 of the image processing apparatus 110 (NO in step S1205), the processing proceeds to step S1207. When the processing proceeds to step S1207, the web browser module 209 executes the identification ID issuance script for issuance of identification ID.

As described above, an example of a generation unit according to the present exemplary embodiment can be realized, for example, by performing the processing of step S1207. Further, for example, the identification ID serves as identification information.

Next, in step S1208, the web browser module 209 executes the identification ID storage script to store the identification ID issued in step S1207 into the HDD 304 of the image processing apparatus 110. As described above, an example of a storage unit according to the present exemplary embodiment can be realized, for example, by performing the processing of step S1208.

Next, in step S1209, the HTTP module 214 transmits an HTTP request according to a PUT method, which indicates the button depression event (i.e., the UI execution event) generated in step S1204, to the web server unit 131 of the web server 130. In this case, the HTTP module 214 further transmits the identification ID issued in step S1207 to the web server 130. As described above, an example of a transmission unit according to the present exemplary embodiment can be realized, for example, by performing the processing of step S1209.

Next, in step S1210, the web server unit 131 of the web server 130 receives the HTTP request and the identification ID that have been transmitted by the HTTP module 214 in step S1209. In this case, the web server unit 131 stores the received identification ID in the data storage area 1106.

Next, in step S1211, the web server unit 131 requests the business logic unit 1103 to perform logic processing corresponding to the HTTP request received in step S1210.

Next, in step S1212, the business logic unit 1103 acquires a script corresponding to the button depression event (i.e., the pressed button) from the program management area 1105. Then, the business logic unit 1103 instructs the script engine unit 1102 to perform processing for executing the acquired script.

Next, in step S1213, the script engine unit 1102 reads, from the script, processing contents and setting information for the image processing apparatus 110. Then, the script engine unit 1102 returns the read result (i.e., the processing contents and the setting information) to the business logic unit 1103.

Next, in step S1214, the business logic unit 1103 successively executes processing (i.e., a program) corresponding to the HTTP request transmitted in step S1209.

Next, in step S1215, the web service requester unit 1101 transmits an HTTP request to the web service provider module 207 of the image processing apparatus 110, to call a web service corresponding to the execution result in step S1214. In this case, if the identification ID is stored in the data storage area 1106, the web service requester unit 1101 returns the identification ID to the image processing apparatus 110. After the identification ID is returned to the image processing apparatus 110, the identification ID is deleted from the data storage area 1106.

Next, in step S1216, the web service provider module 207 of the image processing apparatus 110 receives the web service call request transmitted by the web service requester unit 1101 in step S1215. As described above, in a case where the identification ID is stored in the data storage area 1106, the web service provider module 207 receives the returned identification ID.

As described above, an example of a reception unit (i.e., an acquisition step) according to the present exemplary embodiment can be realized, for example, by performing the processing of step S1216. Further, the web service call request serves as a control request.

Next, in step S1217, the image processing apparatus 110 collates the identification ID received in step S1216 with the identification ID stored in the HDD 304 of the image processing apparatus 110. As described above, an example of a determination unit according to the present exemplary embodiment can be realized, for example, by performing the processing of step S1217.

Figure 15:
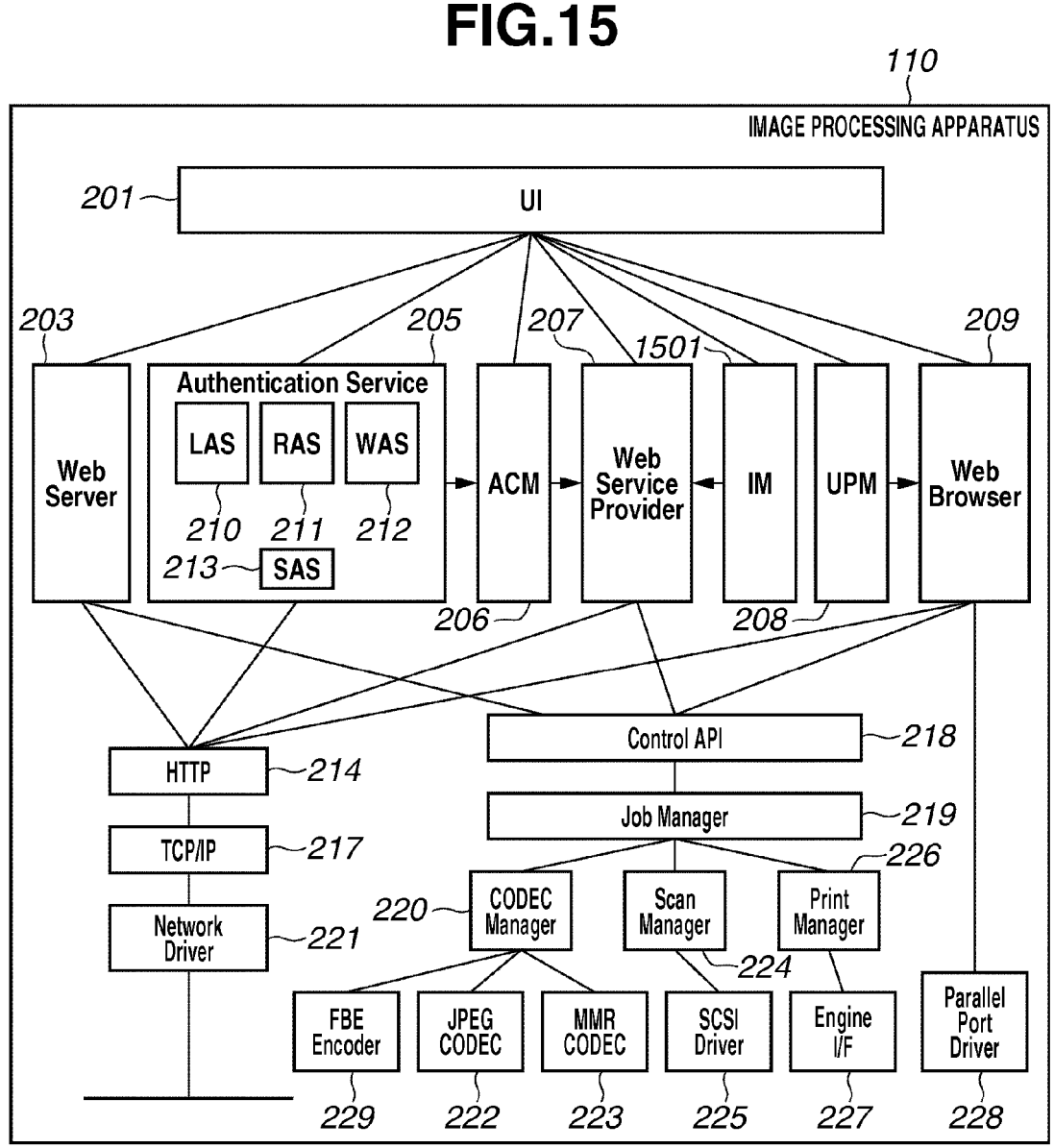
FIG. 15 is a block diagram illustrating an identification ID collation module that performs identification ID collation in addition to the software configuration for the image processing apparatus illustrated in FIG. 2, according to the first exemplary embodiment of the present invention.

FIG. 15 illustrates an identification ID collation module (IM) 1501 that can perform the above-described identification ID collation processing (i.e., the processing to be performed in step S1217 illustrated in FIG. 12), in addition to the software configuration for the image processing apparatus illustrated in FIG. 2.

If the web service provider module 207 receives the HTTP request including the web service call request from the web server 130, the identification ID collation module (IM) 1501 acquires the HTTP request and the identification ID from the HDD 304 of the image processing apparatus 110. Then, the identification ID collation module (IM) 1501 determines whether the acquired identification IDs coincide with each other.

If it is determined that the identification ID acquired from the HTTP request coincides with the identification ID acquired from the HDD 304 of the image processing apparatus 110 (YES in step S1217), then in step S1219, the web service provider module 207 performs web service call processing.

When the processing proceeds to step S1219, the web service provider module 207 calls a web service corresponding to the web service call request (i.e., an external processing request) included in the HTTP request. Next, in step S1220, the web service provider module 207 executes the web service having been called in step S1219. As described above, an example of an execution unit according to the present exemplary embodiment can be realized, for example, by performing the processing of step S1220.

Next, in step S1221, after confirming termination of the executed web service, the web browser module 209 deletes the identification ID stored in the HDD 304 of the image processing apparatus 110. As described above, an example of a deletion unit according to the present exemplary embodiment can be realized, for example, by performing the processing of step S1221.

On the other hand, if it is determined that the identification ID acquired from the HTTP request received from the web server 130 is different from the identification ID acquired from the HDD 304 of the image processing apparatus 110 (NO in step S1217), the processing proceeds to step S1218. In this case, the identification ID collation module (IM) 1501 determines that the HTTP request received from the web server 130 is not derived from the button depression event having been generated in step S1204.

More specifically, the identification ID collation module (IM) 1501 determines that the HTTP request received from the web server 130 is not the one generated by an operation of the user who stands in front of the image processing apparatus 110. In the case where the identification ID acquired from the HTTP request received from the web server 130 is different from the identification ID acquired from the HDD 304 of the image processing apparatus 110, the HTTP request received from the web server 130 may not include any identification ID.

Figure 16:
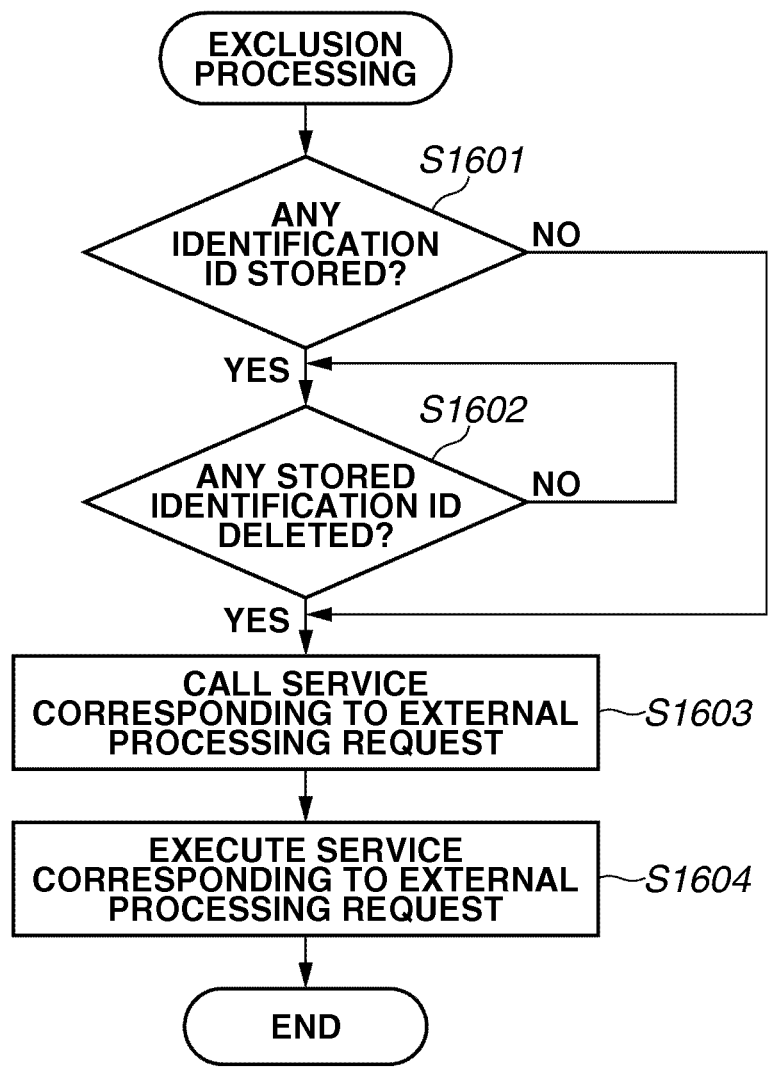
FIG. 16 is a flowchart illustrating an example of exclusion processing to be performed in step S1218 illustrated in FIG. 12, according to the first exemplary embodiment of the present invention.

FIG. 16 is a flowchart illustrating an example of the exclusion processing to be performed in step S1218 illustrated in FIG. 12.

First, in step S1601, the web service provider module 207 determines whether there is any identification ID stored in the HDD 304 of the image processing apparatus 110. If it is determined that there is not any identification ID stored in the HDD 304 of the image processing apparatus 110 (NO in step S1601), the processing directly proceeds to a below-described step S1603 while skipping step S1602.

On the other hand, if it is determined that there is an identification ID stored in the HDD 304 of the image processing apparatus 110 (YES in step S1601), the processing proceeds to step S1602. When the processing proceeds to step S1602, the web service provider module 207 terminates the execution of the web service corresponding to the identification ID stored in the HDD 304 of the image processing apparatus 110 and waits for a while until deletion of the identification ID is completed. Therefore, even when the HTTP request including the web service call request is received from the web server 130, the web service is suspended without being executed.

Then, if the deletion of the identification ID stored in the HDD 304 of the image processing apparatus 110 is completed, the processing proceeds to step S1603. When the processing proceeds to step S1603, the web service provider module 207 calls a web service corresponding to the web service call request (i.e., the external processing request) included in the HTTP request.

Next, in step S1604, the web service provider module 207 executes the web service having been called in step S1603. As described above, an example of the execution unit according to the present exemplary embodiment can be realized, for example, by performing the processing of step S1604.

As described above, in the present exemplary embodiment, if a user operates the application screen (UI) transmitted from the web server 130, the web browser module 209 generates and stores the identification ID that can be used to identify the user who stands in front of the image processing apparatus 110 and has done the operation. Then, the HTTP module 214 transmits the generated identification ID, together with a UI execution event indicating operation contents of the UI, to the web server 130.

The web server 130 temporarily stores the received identification ID and executes the processing corresponding to the received UI execution event. Then, the web server 130 transmits a web service call request corresponding to the execution result, together with the temporarily stored identification ID, to the image processing apparatus 110.

The identification ID collation module (IM) 1501 of the image processing apparatus 110 determines whether the identification ID received from the web server 130 coincides with the identification ID stored in the image processing apparatus 110. Then, if it is determined that the identification ID received from the web server 130 does not coincide with the identification ID stored in the image processing apparatus 110, any other web service call request transmitted from the web server 130 is suspended until deletion of the identification ID stored in the image processing apparatus 110 is completed.

As described above, in the present exemplary embodiment, an identification ID is attached to the "web service call request for each function of the image processing apparatus 110" corresponding to the external processing request instructed by the user who stands in front of the image processing apparatus 110. The identification ID is the information to be issued by the image processing apparatus 110 and stored in the image processing apparatus 110 when a user executes the screen UI that is exclusively delivered from the web server 130 to the image processing apparatus 110. More specifically, the identification ID is the information that is not included in a web service call request to be transmitted to the image processing apparatus 110 from other apparatus.

Accordingly, the image processing apparatus 110 can determine whether the external processing request (i.e., the web service call request) received from the web server 130 has been instructed by the user who stands in front of the image processing apparatus 110, by referring to the presence of the identification ID. Therefore, the image processing apparatus 110 can prioritize the external processing request instructed by the user who stands in front of the image processing apparatus 110 and can safely execute the processing.

An image processing system according to a second exemplary embodiment of the present invention is described below. In the above-described first exemplary embodiment, the web service call request is transmitted only one time from the web service requester unit 1101 of the web server 130 to the web service provider module 207 of the image processing apparatus 110.

In the present exemplary embodiment, transmission of the web service call request is continuously performed plural times. The present exemplary embodiment is different from the above-described first exemplary embodiment in part of the processing to be performed by the web server 130 for the web service call request and in part of the processing to be executed by the image processing apparatus 110 for the called web service. Accordingly, in the following description for the present exemplary embodiment, detailed descriptions for the portions similar to those already described in the first exemplary embodiment are not repeated.

Figure 17:
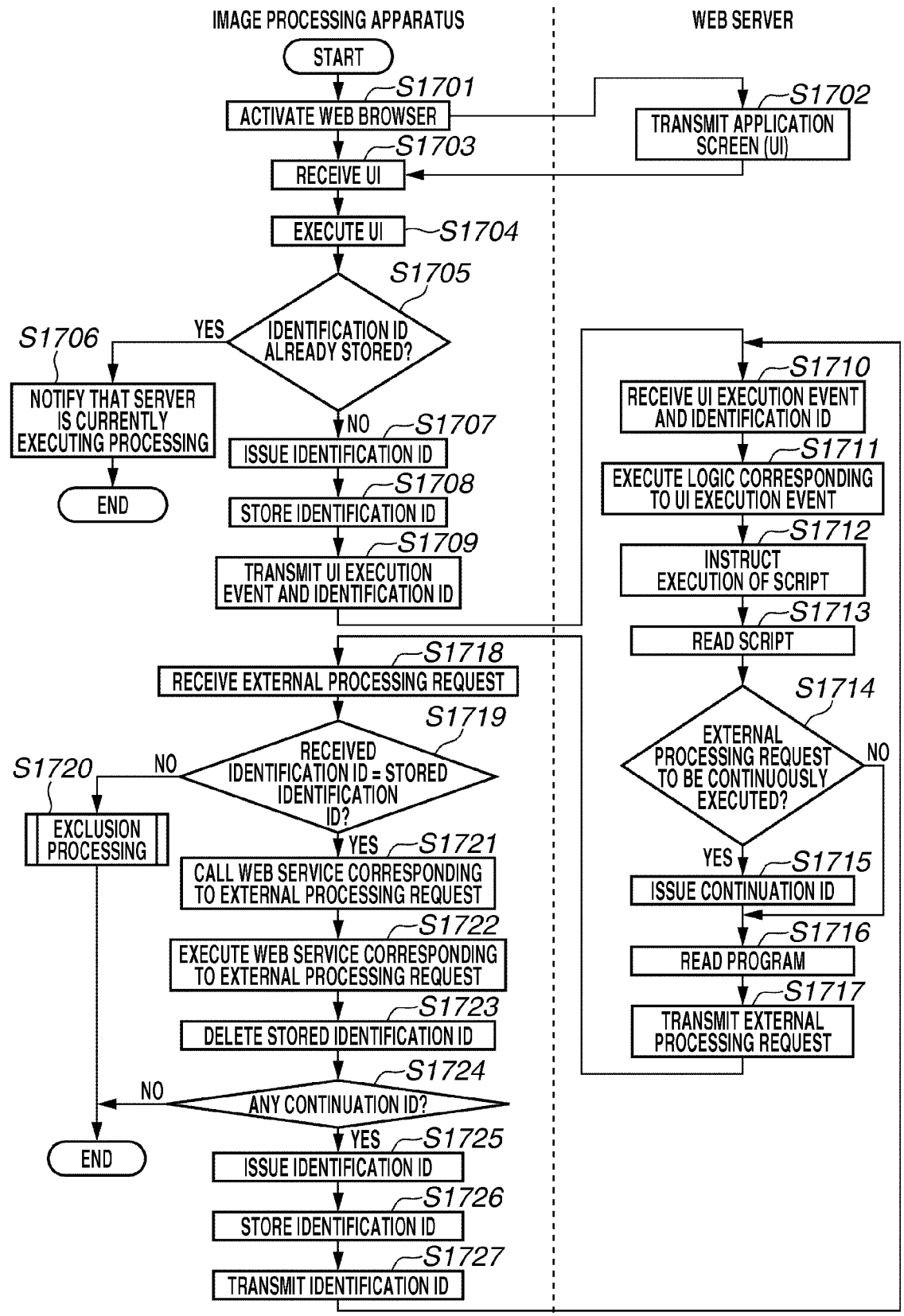
FIG. 17 is a flowchart illustrating an example of processing to be performed by the image processing system according to a second exemplary embodiment of the present invention.

FIG. 17 is a flowchart illustrating an example of processing to be performed by the image processing system according to the present exemplary embodiment. As described above, in the present exemplary embodiment, transmission of the "web service call request" from the web service requester unit 1101 of the web server 130 to the web service provider module 207 of the image processing apparatus 110 is continuously repeated.

The above-described continuous repetition of the web service call request indicates a state where the web service execution (see step S1220) is performed plural times in the sequential processing of step S1204 to step S1221 illustrated in FIG. 12.

The flowchart illustrated in FIG. 17 is similar to the flowchart illustrated in FIG. 12 (according to which the web service call request is transmitted only one time) in many steps. Therefore, the following description for the flowchart illustrated in FIG. 17 is directed to limited portions that are different from those described with reference to the flowchart illustrated in FIG. 12. Processing to be performed in steps S1701 to S1712 illustrated in FIG. 17 is similar to the above-described processing to be performed in steps S1201 to S1212 and therefore detailed descriptions for the same are not repeated.

Accordingly, an example of a second reception unit (i.e., a second acquisition step) according to the present exemplary embodiment can be realized, for example, by performing the processing of step S1703. An example of a generation unit according to the present exemplary embodiment can be realized, for example, by performing the processing of step S1707. Further, an example of a storage unit according to the present exemplary embodiment can be realized, for example, by performing the processing of step S1708. An example of a transmission unit according to the present exemplary embodiment can be realized, for example, by performing the processing of step S1709.

In step S1713, the script engine unit 1102 of the web server 130 reads, from the contents of the script, processing contents and setting information corresponding to the image processing apparatus 110. Then, the script engine unit 1102 returns the read result to the business logic unit 1103. In this case, the script engine unit 1102 acquires, from the contents of the script, information indicating whether the web service call is continuously executed during the processing. Then, the script engine unit 1102 returns the acquisition result to the business logic unit 1103.

Next, in step S1714, the business logic unit 1103 determines whether the execution of the web service call is continuous, based on the information received from the script engine unit 1102 in step S1713. If it is determined that the execution of the web service call is not continuous (NO in step S1714), the processing directly proceeds to step S1716 while skipping step S1715. On the other hand, if it is determined that the execution of the web service call is continuous (YES in step S1714), the processing proceeds to step S1715.

When the processing proceeds to step S1715, the business logic unit 1103 issues a continuation ID. The continuation ID is information indicating that the web service call request to be transmitted from the web server 130 to the image processing apparatus 110 during the sequential processing is continuous. In step S1717, the web server 130 transmits the generated continuation ID, together with an HTTP request, to the image processing apparatus 110.

Processing to be performed in steps S1716 to S1723 is similar to the above-described processing to be performed in steps S1214 to S1221 and therefore detailed descriptions for the same are not repeated. Accordingly, an example of a reception unit (i.e., an acquisition step) according to the present exemplary embodiment can be realized, for example, by performing the processing of step S1718. An example of an execution unit according to the present exemplary embodiment can be realized, for example, by performing the processing of step S1722. Further, an example of a deletion unit according to present exemplary embodiment can be realized, for example, by performing the processing of step S1723.

In step S1724, the web browser module 209 of the image processing apparatus 110 determines whether there is any continuation ID contained in the HTTP request received by the web service provider module 207 of the image processing apparatus 110 in step S1718. If it is determined that the HTTP request does not include any continuation ID (NO in step S1724), processing to be performed in steps S1725 to S1727 is skipped and the image processing apparatus 101 terminates the processing routine illustrated in FIG. 17.

On the other hand, if it is determined that the continuation ID is contained in the HTTP request (YES in step S1724), the processing proceeds to step S1725. When the processing proceeds to step S1725, the web browser module 209 newly issues the identification ID. As described above, an example of a generation unit according to the present exemplary embodiment can be realized, for example, by performing the processing of step S1725.

Next, in step S1726, the web browser module 209 stores the issued identification ID in the HDD 304 of the image processing apparatus 110. As described above, an example of the storage unit according to the present exemplary embodiment can be realized, for example, by performing the processing of step S1726.

Next, in step S1727, the HTTP module 214 transmits the identification ID issued in step S1725 to the web server 130 and continuously executes the sequential processing starting from step S1710. As described above, an example of the transmission unit according to the present exemplary embodiment can be realized, for example, by performing the processing of step S1727.

As described above, in the present exemplary embodiment, the web server 130 determines whether to continuously execute the web service call based on the HTTP request that contains the identification ID transmitted from the image processing apparatus 110. If it is determined that the execution of the web service call is continuous, the web server 130 transmits the identification ID and the continuation ID, together with the HTTP request, to the image processing apparatus 110.

In a case where the continuation ID is contained in the HTTP request, the image processing apparatus 110 newly issues the identification ID and transmits the newly issued identification ID to the web server 130. Accordingly, even in a case where the web service call request is continuously transmitted to the image processing apparatus 110 during the sequential processing executed by the web server 130, the present exemplary embodiment can prevent the sequential processing from being interrupted by a web service call request issued from any apparatus other than the image processing apparatus 110.

An image processing system according to a third exemplary embodiment of the present invention is described below. According to the above-described first exemplary embodiment, the web service call request is transmitted only one time to the image processing apparatus 110. According to the second exemplary embodiment, the web service call request is repetitively transmitted.

The present exemplary embodiment manages the identification ID to be issued and stored by the image processing apparatus 110, for each web service corresponding to each function of the image processing apparatus 110. The present exemplary embodiment is different from the above-described first and second exemplary embodiments in part of the processing relating to the identification ID. Accordingly, in the following description for the present exemplary embodiment, detailed descriptions for the portions similar to those already described in the first or second exemplary embodiment are not repeated.

Figure 18:
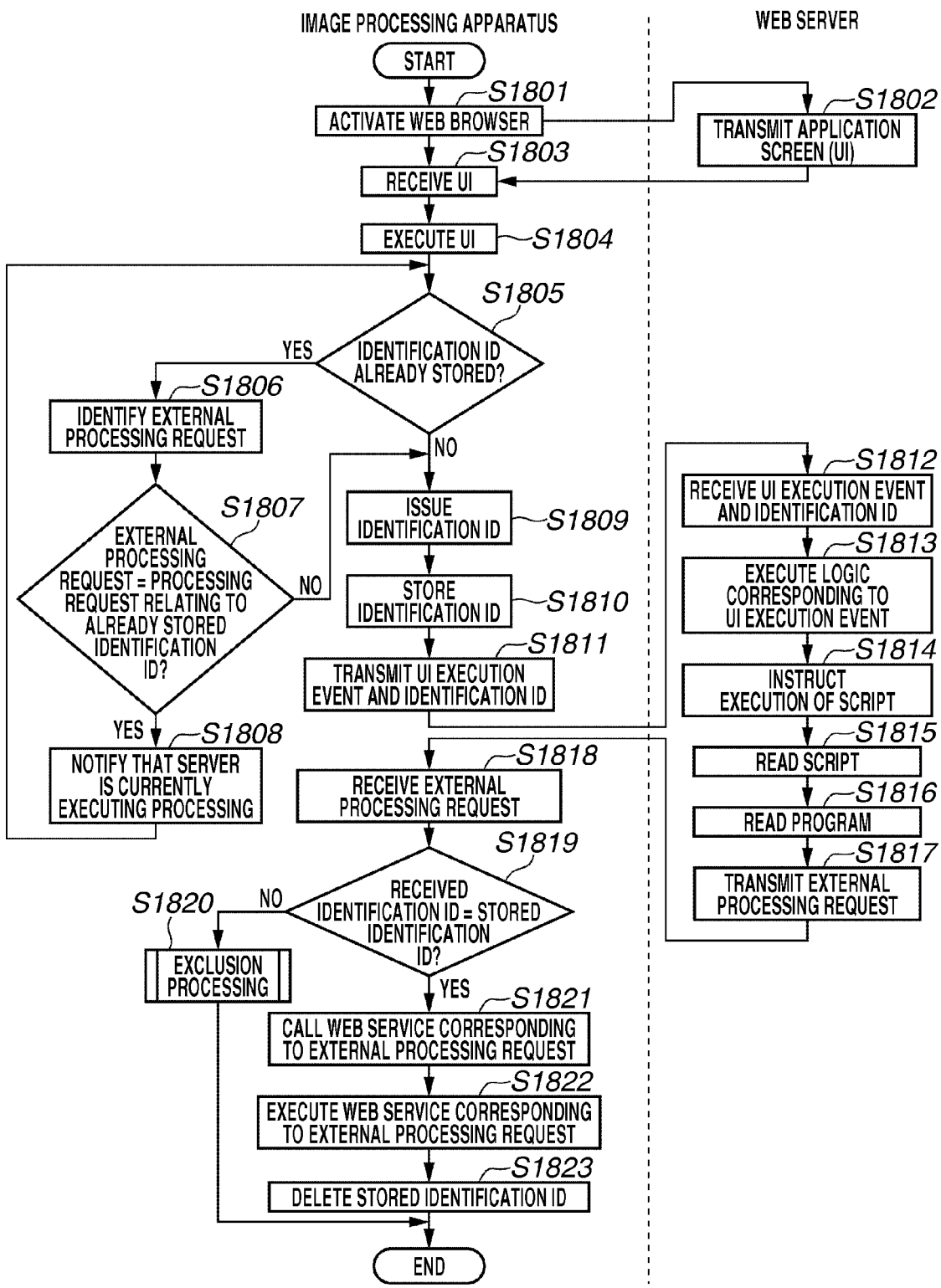
FIG. 18 is a flowchart illustrating an example of processing to be performed by the image processing system according to a third exemplary embodiment of the present invention.

FIG. 18 is a flowchart illustrating an example of processing to be performed by the image processing system according to the present exemplary embodiment. The flowchart illustrated in FIG. 18 is similar to the flowchart illustrated in FIG. 12 (according to which the web service call request is transmitted only one time) in many steps. Therefore, the following description for the flowchart illustrated in FIG. 18 is directed to limited portions that are different from those described with reference to the flowchart illustrated in FIG. 12. Processing to be performed in step S1801 illustrated in FIG. 18 is similar to the above-described processing to be performed in step S1201 and therefore a detailed description for the step S1801 is omitted in the following description.

Next, in step S1802, the web server unit 131 of the web server 130 receives an HTTP request according to the GET method from the image processing apparatus 110. Then, the business logic unit 1103 constructs an application screen (UI) corresponding to the user and generates a screen UI. The web server unit 131 transmits (returns), to the image processing apparatus 110, the application screen (UI) generated by the business logic unit 1103 as an HTTP response replying to the HTTP request transmitted in step S1801.

The business logic unit 1103 further generates two types of scripts in addition to the application screen (UI). The first script is the identification ID issuance script for issuing an identification ID that can be used to determine whether the user who stands in front of the image processing apparatus 110 has input an instruction via the application screen (UI). The second script is the identification ID storage script for storing an issued identification ID in the HDD 304 of the image processing apparatus 110.

The web browser module 209 of the image processing apparatus 110 can execute the above-described first and second scripts. In the present exemplary embodiment, the business logic unit 1103 further generates a script for notifying the image processing apparatus 110 of a type of a called web service beforehand, when the script is executed, in addition to the above-described first and second scripts. The web server unit 131 can transmit these scripts in association with the application screen (UI) to the image processing apparatus 110.

Processing to be performed in steps S1803 to S1805 illustrated in FIG. 18 is similar to the above-described processing to be performed in steps S1203 to S1205 and therefore detailed descriptions for these steps are omitted in the following description. Accordingly, an example of a second reception unit (i.e., a second acquisition step) according to the present exemplary embodiment can be realized, for example, by performing the processing of step S1803.

When the processing proceeds to step S1806, the web browser module 209 identifies a web service call request (i.e., an external processing request) of a function of the image processing apparatus 110 that is related to the identification ID already stored in the HDD 304 of the image processing apparatus 110. In the present exemplary embodiment, the function relating to the identification ID is, for example, a print function, a copy function, or a scan function.

Next, in step S1807, the web browser module 209 determines whether an identification ID has been already issued for performing a web service call similar to the web service call corresponding to the "screen UI execution instruction from a user" detected by the UI module 201. If it is determined that the identification ID is already issued (YES in step S1807), the processing proceeds to step S1808.

When the processing proceeds to step S1808, the web browser module 209 displays, on the browser screen 800 (not illustrated), information that indicates that the processing is currently executed in the web server 130. Then, the web browser module 209 interrupts the execution of the application screen (UI). On the other hand, if it is determined that the identification ID is not issued yet (NO in step S1807), then in step S1809, the web browser module 209 executes the identification ID issuance script to issue the identification ID. In this case, the web browser module 209 also generates information required to identify a type of the web service to be executed. The generated information is associated with the identification ID.

As described above, an example of a generation unit according to the present exemplary embodiment can be realized, for example, by performing the processing of step S1809. Further, for example, the identification ID serves as the identification information. The information required to identify the type of the web service to be executed serves as processing determination information.

Processing to be performed in steps S1809 to S1819 illustrated in FIG. 18 is similar to the above-described processing to be performed in steps S1207 to S1217 and therefore detailed descriptions for these steps are omitted in the following description. However, in step S1809, the web browser module 209 generates the information indicating a web service of a function of the image processing apparatus 110 to be called, as described above, in addition to the identification ID. Further, in step S1810, the web browser module 209 stores the identification ID and the information indicating the web service of the function of the image processing apparatus 110 to be called in the HDD 304.

Accordingly, an example of a storage unit according to the present exemplary embodiment can be realized, for example, by performing processing of step S1810. An example of a transmission unit according to the present exemplary embodiment can be realized, for example, by performing processing of step S1811. Further, an example of a reception unit (i.e., an acquisition step) according to the present exemplary embodiment can be realized, for example, by performing processing of step S1818.

If it is determined that the identification ID stored in the HDD 304 of the image processing apparatus 110 is different from the identification ID contained in the HTTP request received from the web server 130 (NO in step S1819), then in step S1820, the image processing apparatus 101 performs the exclusion processing. As described above, an example of a first determination unit according to the present exemplary embodiment can be realized, for example, by performing the processing of step S1819.

Figure 19:
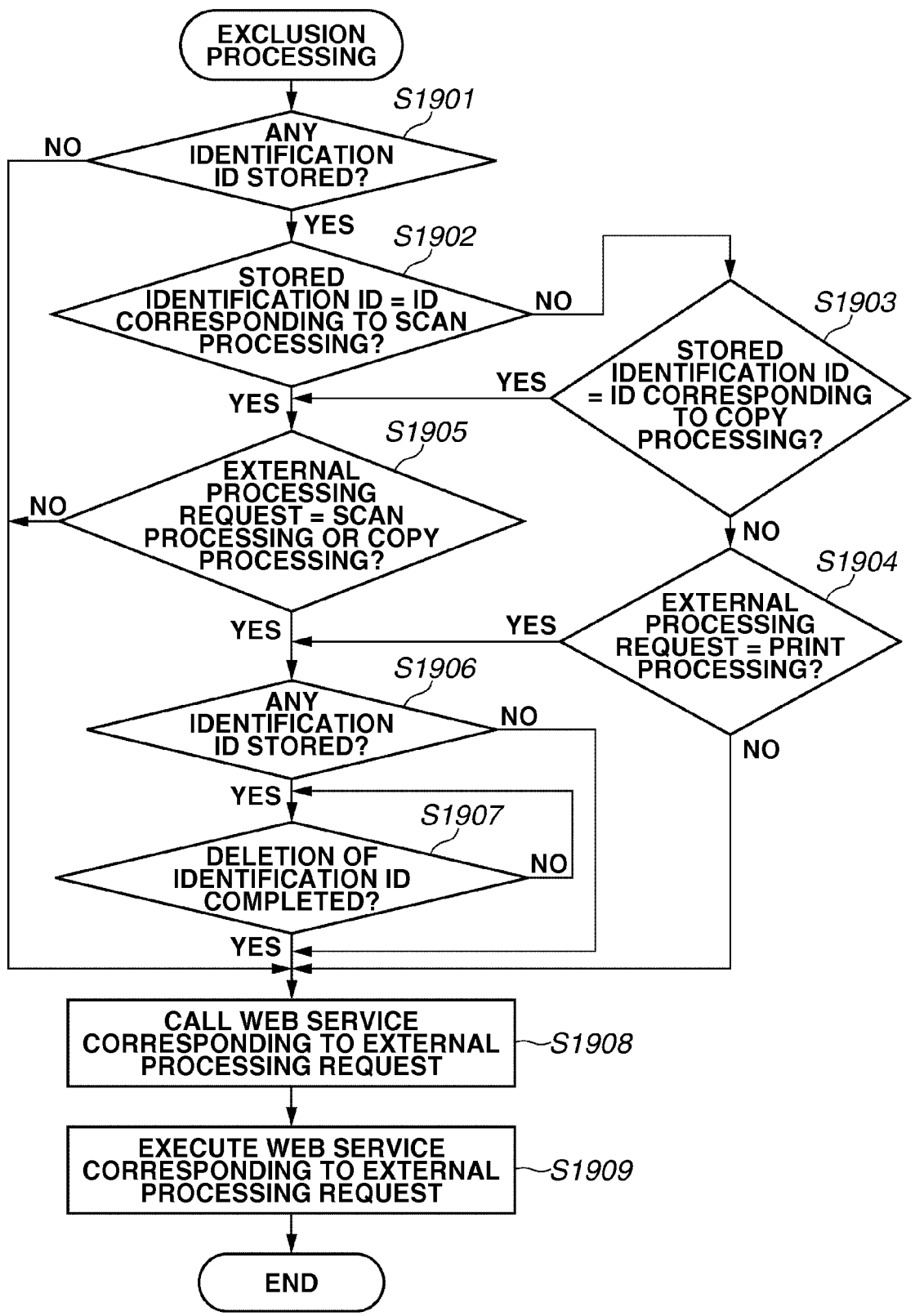
FIG. 19 is a flowchart illustrating an example of exclusion processing to be performed in step S1820 illustrated in FIG. 18 according to the third exemplary embodiment of the present invention.

FIG. 19 is a flowchart illustrating an example of the exclusion processing to be performed in step S1820 of FIG. 18.

First, in step S1901, the web browser module 209 determines whether there is any identification ID stored in the HDD 304 of the image processing apparatus 110. If it is determined that there is not any identification ID stored in the HDD 304 (NO in step S1901), the processing proceeds to step S1908.

When the processing proceeds to step S1908, the web service provider module 207 calls a web service corresponding to the web service call request (i.e., the external processing request) contained in the HTTP request. Next, in step S1909, the web service provider module 207 executes the web service having been called in step S1908.

On the other hand, if it is determined that there is the identification ID stored in the HDD 304 (YES in step S1901), then in step S1902, the web browser module 209 determines whether to suspend the execution of the external processing request based on the type of the called web service that relates to the identification ID stored in the HDD 304.

First, in step S1902, the web browser module 209 determines whether the web service call relating to the identification ID stored in the HDD 304 is a scan service call (determines whether the identification ID corresponds to the scan processing).

If it is determined that the web service call relating to the identification ID stored in the HDD 304 is not the scan service call (NO in step S1902), the processing proceeds to a below-described step S1903.

On the other hand, if it is determined that the web service call relating to the identification ID stored in the HDD 304 is the scan service call (YES in step S1902), the processing proceeds to step S1905. When the processing proceeds to step S1905, the web service provider module 207 determines whether the web service call (i.e., the external processing request) received from the web service requester unit 1101 is a scan service call or a copy service call.

If it is determined that the web service call received from the web service requester unit 1101 is the scan service call or the copy service call (YES in step S1905), the processing proceeds to step S1906. When the processing proceeds to step S1906, the web service provider module 207 determines whether the identification ID is stored in the HDD 304 of the image processing apparatus 110. If it is determined that the identification ID is not stored in the HDD 304 of the image processing apparatus 110 (NO in step S1906), the processing directly proceeds to a below-described step S1908 while skipping step S1907.

On the other hand, if it is determined that the identification ID is stored in the HDD 304 of the image processing apparatus 110 (YES in step S1906), the processing proceeds to step S1907. When the processing proceeds to step S1907, the web service provider module 207 waits for a while until the execution of the web service corresponding to the identification ID stored in the HDD 304 of the image processing apparatus 110 is completed and the identification ID is deleted.

Therefore, even in a case where an HTTP request containing a web service call request is received from the web server 130, the web service is suspended without being executed. Then, the processing proceeds to step S1908.

When the processing proceeds to step S1908, the web service provider module 207 calls a web service corresponding to the web service call request (i.e., the external processing request) contained in the HTTP request. Next, in step S1909, the web service provider module 207 executes the web service having been called in step S1908.

As described above, if it is determined that the web service call relating to the identification ID stored in the HDD 304 is not the scan service call (NO in step S1902), the processing proceeds to step S1903. When the processing proceeds to step S1903, the web browser module 209 determines whether the web service call relating to the identification ID stored in the HDD 304 is a copy service call (i.e., whether the identification ID corresponds to the copy processing).

If it is determined that the web service call relating to the identification ID stored in the HDD 304 is the copy service call (YES in step S1903), then in step S1905, as described above, the web service provider module 207 determines whether the web service call (i.e., the external processing request) received from the web service requester unit 1101 is a scan service call or a copy service call.

On the other hand, if it is determined that the web service call relating to the identification ID stored in the HDD 304 is not the copy service call (NO in step S1903), the processing proceeds to step S1904.

In this case, through the determination steps S1902 and S1903, it is concluded the web service call relating to the identification ID stored in the HDD 304 is the print service. Therefore, in step S1904, the web service provider module 207 determines whether the web service call (i.e., the external processing request) received from the web service requester unit 1101 is a print service.

If it is determined that the web service call received from the web service requester unit 1101 is the print service (YES in step S1904), then in step S1906, the execution of the processing is suspended until the identification ID stored in the HDD 304 is deleted. On the other hand, if it is determined that the web service call received from the web service requester unit 1101 is not the print service (NO in step S1904), the processing proceeds to an above-described step S1908. The web service provider module 207 executes the external processing request (i.e., the print processing).

As described above, an example of a second determination unit according to the present exemplary embodiment can be realized, for example, by performing the processing in steps S1902 to S1905. An example of an execution unit according to the present exemplary embodiment can be realized, for example, by performing the processing of step S1909.

FIG. 20 illustrates an example of the identification ID. The identification ID illustrated in FIG. 20 can be issued in step S1707 or S1725. In FIG. 20, information 2001 is an example of information that constitutes the identification ID. Further, information 2002 is an example of the identification ID. As illustrated in FIG. 20, in the present exemplary embodiment, the identification ID 2002 to which the information required to identify the type of the web service to be executed is given is issued for the information 1401 illustrated in FIG. 14.

As described above, in the present exemplary embodiment, the information required to identify the type of the web service to be executed is given to the identification ID to be used to identify that the user who stands in front of the image processing apparatus 110 inputs an instruction via the application screen (UI). Then, the present exemplary embodiment compares the information required to identify the type of the web service to be executed. If it is determined that the same type of web service is currently executed, the present exemplary embodiment suspends the processing based on the external processing request.

Accordingly, even in a case where the identification ID is stored in the HDD 304 of the image processing apparatus 110, if it is determined that the web service call is not repetitive, the present exemplary embodiment can prevent the processing from being unnecessarily controlled exclusively. The present exemplary embodiment is applicable not only to the first exemplary embodiment but also to the second exemplary embodiment.

An image processing system according to a fourth exemplary embodiment of the present invention is described below. In a case where the business logic unit 1103 of the web server 130 requires a long time to execute the processing corresponding to the HTTP request received from the HTTP module 214 of the image processing apparatus 110, a time-out may occur in the web server 130.

If the time-out occurs, the HTTP connection between the image processing apparatus 110 and the web server 130 is not maintained. In this case, the image processing apparatus 110 does not receive any external processing request corresponding to the identification ID stored in the HDD 304 from the web server 130. Therefore, the identification ID stored in the HDD 304 remains unnecessarily without being deleted and may cause an interference with other external processing request to be executed.

Hence, the image processing system according to the present exemplary embodiment can delete the identification ID stored in the image processing apparatus 110 even when the time-out occurs in the web server 130. In other words, compared to the above-described first to third exemplary embodiments, the present exemplary embodiment includes additional processing to be performed in response to the time-out generated in the web server 130. Accordingly, in the following description for the present exemplary embodiment, detailed descriptions for the portions similar to those already described in the first to third exemplary embodiment are not repeated.

FIG. 21 is a flowchart illustrating an example of processing to be performed by the image processing system according to the present exemplary embodiment. As described above, the image processing system according to the present exemplary embodiment can perform recovery processing in response to the time-out generated in the web server 130.

The flowchart illustrated in FIG. 21 is different from the flowchart illustrated in FIG. 12 (according to which the web service call request is transmitted only one time) in the additional processing to be performed in response to the time-out. Therefore, the following description for the flowchart illustrated in FIG. 21 is directed to limited portions that are different from those described with reference to the flowchart illustrated in FIG. 12.

Processing to be performed in steps S2101 to S2114 illustrated in FIG. 21 is similar to the above-described processing to be performed in steps S1201 to S1214 and therefore detailed descriptions for these steps are omitted in the following description. Accordingly, an example of a second reception unit (i.e., a second acquisition step) according to the present exemplary embodiment can be realized, for example, by performing the processing of step S2103. An example of a generation unit according to the present exemplary embodiment can be realized, for example, by performing the processing of step S2107. Further, an example of a storage unit according to the present exemplary embodiment can be realized, for example, by performing the processing of step S2108. An example of a transmission unit according to the present exemplary embodiment can be realized, for example, by performing the processing of step S2109.

In step S2114, process as referred at S1214 is executed and the business logic unit 1103 of the web server 130 sends a time-out generation notification to the web server unit 131 in response to an occurrence of time-out during the execution of the processing.

Next, in step S2115, the business logic unit 1103 determines whether any time-out occurs. If it is determined that the time-out is generated (YES in step S2115), then in step S2116, the web server unit 131 transmits a time-out notification to the image processing apparatus 110.

On the other hand, if it is determined that the business logic unit 1103 has completed the processing without causing any time-out (NO in step S2115), the processing proceeds to step S2117. When the processing proceeds to step S2117, the web service requester unit 1101 transmits an external processing request (i.e., an HTTP request to perform a web service call) and the identification ID to the web service provider module 207 of the image processing apparatus 110. The processing to be performed in step S2117 is similar to the processing to be performed in step S1215.

Next, in step S2118, the web service provider module 207 of the image processing apparatus 110 receives the information (i.e., UI execution result) having been transmitted in step S2116 or in S2117. More specifically, the web service provider module 207 receives the external processing request to which the identification ID is added or the time-out notification. As described above, an example of a reception unit (i.e., an acquisition step) and an example of a third reception unit (i.e., a third acquisition step) according to the present exemplary embodiment can be realized, for example, by performing the processing of step S2118.

Next, in step S2119, the web browser module 209 of the image processing apparatus 110 determines whether the UI execution result received from the web server 130 in step S2118 is the time-out notification. If it is determined that the UI execution result is normal (i.e., when the UI execution result is the external processing request to which the identification ID is added) (NO in step S2119), the processing proceeds to step S2120. Processing to be performed in steps S2120 to S2124 is similar to the above-described processing to be performed in steps S1217 to S1221. Accordingly, an example of an execution unit according to the present exemplary embodiment can be realized, for example, by performing the processing of step S2123.

On the other hand, if it is determined that the UI execution result is the time-out notification (YES in step S2119), then in step S2124, the web browser module 209 deletes the identification ID stored in the HDD 304 of the image processing apparatus 110 and terminates the processing. In this case, the web browser module 209 displays, on the browser screen 800 of the image processing apparatus 110, information that indicates that the processing is interrupted in response to the time-out generated in the web server 130.

As described above, an example of a second deletion unit according to the present exemplary embodiment can be realized, for example, by performing the processing of step S2124.

As described above, in the present exemplary embodiment, the web server 130 transmits the time-out notification to the image processing apparatus 110 in response to an occurrence of the time-out. If the image processing apparatus 110 receives the time-out notification from the web server 130, the image processing apparatus 110 deletes the identification ID stored therein.

Accordingly, in a case where the processing of the web server 130 is interrupted and no execution result is transmitted to the image processing apparatus 110, the present exemplary embodiment can prevent the identification ID from remaining in the HDD 304 of the image processing apparatus 110 without being deleted. Accordingly, the present exemplary embodiment can prevent the unnecessarily remaining identification ID from interfering with other external processing request to be executed.

The present exemplary embodiment is applicable not only to the first exemplary embodiment but also to the second or third exemplary embodiment.

The above-described exemplary embodiments use the application screen (UI) generated by the web server 130 using the HTML (or the like) format, which can be interpreted and executed by the web browser module 209 illustrated in FIG. 15.

However, the screen UI is not limited to the one delivered from the web server 130 to the web browser module 209 of the image processing apparatus 110. The screen UI may be a local user interface that is directly displayed on the UI module 201 of the image processing apparatus 110 so that the screen UI can be executed by users.

As described above, by executing the present invention, the identification ID is added to the external processing request when it is instructed by the user who stands in front of the image processing apparatus 110 and to the corresponding web service call that is received from the server. The identification ID can be used to determine whether the user who uses the web service of each function of the image processing apparatus is present in front of the image processing apparatus. Therefore, the external processing request instructed by the user who stands in front of the image processing apparatus 110 can be prioritized and the processing can be safely executed.

Further, the present exemplary embodiment can be embodied, for example, as a system, an apparatus, a method, a program, or a storage medium. More specifically, the present exemplary embodiment is applicable to a system including two or more devices. Further, the present exemplary embodiment is applicable to an apparatus including a single device.

Moreover, the present exemplary embodiment includes software programs that can realize the functions of the above-described exemplary embodiments (i.e., the programs corresponding to the flowcharts illustrated in FIGS. 12, 16 to 19, and 21 according to the exemplary embodiments), which can be directly or remotely supplied to the system or the apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-335039 filed Dec. 26, 2008, which is hereby incorporated by reference herein in its entirety.

What is claimed is:

1. A data processing apparatus that requests an external apparatus to execute a part of sequential processing, receives a control request from the external apparatus, and executes the sequential processing in response to the control request that reflects an execution result of the part of the sequential processing performed by the external apparatus, the data processing apparatus comprising:
   a generation unit configured to generate identification information that can be used to determine whether a processing execution request sent to the external apparatus is output via an operation unit of the data processing apparatus;
   a storage unit configured to store the identification information generated by the generation unit in a storage medium;
   a transmission unit configured to transmit the identification information generated by the generation unit to the external apparatus;
   a reception unit configured to receive the control request from the external apparatus;
   a determination unit configured to determine whether the identification information stored on the storage unit coincides with identification information added to the control request received by the reception unit; and
   an execution unit configured to execute processing to be performed based on the control request if the determination unit determines that the identification information stored on the storage unit coincides with the identification information added to the control request received by the reception unit,
   wherein the execution unit is configured to execute the processing to be performed based on the control request after completing execution of processing to be performed based on the identification information stored on the storage unit, if the determination unit determines that the identification information stored on the storage unit does not coincide with the identification information added to the control request received by the reception unit.

2. The data processing apparatus according to claim 1, further comprising:
   a second reception unit configured to receive, from the external apparatus, information instructing execution of the generation unit and information instructing execution of the storage unit in addition to user interface information; and a display unit configured to display the user interface information on the operation unit, which is received by the second reception unit, wherein the identification information generated by the generation unit is further used to determine whether the processing execution request sent to the external apparatus is output via a user interface displayed on the display unit, based on the information instructing execution of the generation unit that is received by the second reception unit, and the storage unit is configured to store the identification information generated by the generation unit in the storage medium, based on the information instructing execution of the storage unit that is received by the second reception unit.

3. The data processing apparatus according to claim 1, further comprising:

a deletion unit configured to delete the identification information stored on the storage unit if the determination unit determines that the identification information stored on the storage unit coincides with the identification information added to the control request received by the reception unit, and when the execution unit completes the processing to be performed based on the control request.

4. The data processing apparatus according to claim 3, wherein the execution unit is configured to execute the processing to be performed based on the control request after the identification information stored on the storage unit is deleted by the deletion unit.

5. The data processing apparatus according to claim 1, wherein the identification information generated by the generation unit is further used to determine whether the processing execution request sent to the external apparatus is output via the operation unit of the data processing apparatus in addition to processing determination information that is used to determine a type of the processing, wherein the storage unit is configured to store, in a storage medium, the identification information and the processing determination information generated by the generation unit, wherein the determination unit comprises:
 a first determination unit configured to determine whether the identification information stored on the storage unit coincides with the identification information added to the control request received by the reception unit; and
 a second determination unit configured to determine whether processing of a type determined based on the processing determination information stored on the storage unit coincides with the processing to be performed according to the control request received by the reception unit, if the first determination unit determines that the identification information stored on the storage unit does not coincide with the identification information added to the control request received by the reception unit, wherein the execution unit is configured to execute the processing to be performed based on the control request in a case where the first determination unit determines that the identification information stored on the storage unit coincides with the identification information added to the control request received by the reception unit, and in a case where the second determination unit determines that the processing of the type determined based on the processing determination information stored by the storage unit does not coincide with the processing to be performed according to the control request received by the reception unit, and wherein the execution unit is configured to execute the processing to be performed based on the control request after completing the execution of the processing to be performed based on the identification information stored on the storage unit in a case where the second determination unit determines that the processing of the type determined based on the processing determination information stored on the storage unit coincides with the processing to be performed according to the control request received by the reception unit.

6. The data processing apparatus according to claim 1, further comprising:

a third reception unit configured to receive, from the external apparatus, a notification that indicates a time-out generated in the external apparatus; and a second deletion unit configured to delete the identification information stored on the storage unit if the notification that indicates the time-out generated in the external apparatus is received by the third reception unit.

7. A method for a data processing apparatus that requests an external apparatus to execute a part of sequential processing, acquires a control request from the external apparatus, and executes the sequential processing in response to the control request that reflects an execution result of the part of the sequential processing performed by the external apparatus, the method comprising:

a generation step for generating identification information that is used to determine whether a processing execution request sent to the external apparatus is output via an operation unit of the data processing apparatus;

a storage step for storing, in a storage medium, the identification information generated in the generation step;

a transmission step for transmitting the identification information generated in the generation step to the external apparatus;

an acquisition step for acquiring the control request from the external apparatus;

a determination step for determining whether the identification information stored in the storage step coincides with identification information added to the control request acquired in the acquisition step; and an execution step for executing processing to be performed based on the control request if in the determination step it is determined that the identification information stored in the storage step coincides with the identification information added to the control request acquired in the acquisition step, wherein the execution step is for executing the processing to be performed based on the control request after completing execution of processing to be performed based on the identification information stored in the storage step, if in the determination step it is determined that the identification information stored in the storage step does not coincide with the identification information added to the control request acquired in the acquisition step.

8. The data processing method according to claim 7, further comprising:

a second acquisition step for acquiring, from the external apparatus, information instructing execution of the generation step and information instructing execution of the storage step in addition to user interface information; and a display step for displaying the user interface information on the operation unit, which is acquired in the second acquisition step, wherein the identification information generated by the generation step is further used to determine whether the processing execution request sent to the external apparatus is output via a user interface displayed in the display step, based on the information instructing execution of the generation step that is acquired in the second acquisition step, and wherein the storage step is for storing the identification information generated in the generation step in the storage medium, based on the information instructing execution of the storage step that is acquired in the second acquisition step.

9. The data processing method according to claim 7, further comprising:
a deletion step for deleting the identification information stored in the storage step if in the determination step it is determined that the identification information stored in the storage step coincides with the identification information added to the control request acquired in the acquisition step, and when the processing to be performed based on the control request is completed in the execution step.

10. The data processing method according to claim 9, wherein the execution step is for executing the processing to be performed based on the control request after the identification information stored in the storage step is deleted in the deletion step.

11. The data processing method according to claim 7,
wherein the identification information generated by the generation step is further used to determine whether the processing execution request sent to the external apparatus is output via the operation unit of the data processing apparatus, in addition to processing determination information that is used to determine a type of the processing, wherein the storage step is for storing, in the storage medium, the identification information and the processing determination information generated in the generation step, wherein the determination step comprises:
a first determination step for determining whether the identification information stored in the storage step coincides with the identification information added to the control request acquired in the acquisition step; and
a second determination step for determining whether processing of a type determined based on the processing determination information stored in the storage step coincides with the processing to be performed according to the control request acquired in the acquisition step, if in the first determination step it is determined that the identification information stored in the storage step does not coincide with the identification information added to the control request acquired in the acquisition step, wherein the execution step is for executing the processing to be performed based on the control request if in the first determination step it is determined that the identification information stored in the storage step coincides with the identification information added to the control request acquired in the acquisition step, and if in the second determination step it is determined that the processing of the type determined based on the processing determination information stored in the storage step does not coincide with the processing to be performed according to the control request acquired in the acquisition step, and wherein the execution step is for executing the processing to be performed based on the control request after completing the execution of the processing to be performed based on the identification information stored in the storage step if in the second determination step it is determined that the processing of the type determined based on the processing determination information stored in the storage step coincides with the processing to be performed according to the control request acquired in the acquisition step.

12. The data processing method according to claim 7, further comprising:
a third acquisition step for acquiring, from the external apparatus, a notification that indicates a time-out generated in the external apparatus,
a second deletion step for deleting the identification information stored in the storage step if the notification that indicates the time-out generated in the external apparatus is acquired in the third acquisition step.

13. A non-transitory computer-readable storage medium storing a computer program that enables a computer to function as a data processing apparatus that requests an external apparatus to execute a part of sequential processing, acquires a control request from the external apparatus, and executes the sequential processing in response to the control request that reflects an execution result of the part of the sequential processing performed by the external apparatus, the computer program stored in the storage medium comprising:
computer-executable instructions for generating identification information that is used to determine whether a processing execution request sent to the external apparatus is output via an operation unit of the data processing apparatus;
computer-executable instructions for storing the generated identification information in a storage medium;
computer-executable instructions for transmitting the generated identification information to the external apparatus;
computer-executable instructions for acquiring the control request from the external apparatus;
computer-executable instructions for determining whether the stored identification information coincides with identification information added to the acquired control request;
computer-executable instructions for executing processing to be performed based on the control request if it is determined that the stored identification information coincides with the identification information added to the acquired control request; and
computer-executable instructions for executing the processing to be performed based on the control request after completing execution of processing to be performed based on the stored identification information, if it is determined that the stored identification information does not coincide with the identification information added to the acquired control request.

* * * * *